United States Patent
Reimann et al.

(10) Patent No.: US 10,771,274 B2
(45) Date of Patent: Sep. 8, 2020

(54) PLAYBACK QUEUE CONTROL

(71) Applicant: Sonos, Inc., Santa Barbara, CA (US)

(72) Inventors: Robert Reimann, Newton, MA (US);
Abhishek Kumar, Santa Barbara, CA (US); Paul Bates, Santa Barbara, CA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

(21) Appl. No.: 16/657,391

(22) Filed: Oct. 18, 2019

(65) Prior Publication Data

US 2020/0052923 A1 Feb. 13, 2020

Related U.S. Application Data

(63) Continuation of application No. 16/295,390, filed on Mar. 7, 2019, now Pat. No. 10,454,700, which is a (Continued)

(51) Int. Cl.
*H04L 12/28* (2006.01)
*G06F 3/0485* (2013.01)
(Continued)

(52) U.S. Cl.
CPC ........ *H04L 12/2805* (2013.01); *G06F 3/0485* (2013.01); *G06F 3/0486* (2013.01); *G06F 3/0488* (2013.01); *G06F 3/04883* (2013.01); *G06F 3/165* (2013.01); *G06F 16/639* (2019.01); *H04L 12/282* (2013.01); *G06F 2203/04803* (2013.01); *H04L 2012/2849* (2013.01)

(58) Field of Classification Search
CPC ............... H04L 12/2805; H04L 12/282; H04L 2012/2849; G06F 3/0488; G06F 3/165; G06F 16/639; G06F 3/0485; G06F 3/0486; G06F 3/04883; G06F 2203/04803
See application file for complete search history.

(56) References Cited

U.S. PATENT DOCUMENTS 5,440,644 A 8/1995 Farinelli et al.
5,761,320 A 6/1998 Farinelli et al.
(Continued)

FOREIGN PATENT DOCUMENTS

| EP | 1389853 A1 | 2/2004 |
|---|---|---|
| WO | 200153994 | 7/2001 |
| WO | 2003093950 A2 | 11/2003 |

OTHER PUBLICATIONS

Advisory Action dated Jun. 15, 2016, issued in connection with U.S. Appl. No. 13/247,775, filed Sep. 28, 2011, 4 pages.
(Continued)

*Primary Examiner* — David L Ton
(74) *Attorney, Agent, or Firm* — McDonnell Boehnen Hulbert & Berghoff LLP

(57) ABSTRACT

Example techniques involve control of a media playback system involving multiple zones. A control application may include different control interfaces for respective zones of the multiple zones. A control interface for a given zone may include transport controls to control playback in the zone, volume controls to control zone volume level, and an indication of media playing back in the zone. A user may utilize swipe inputs to switch between the control interfaces in order to control different zones.

20 Claims, 17 Drawing Sheets

Related U.S. Application Data continuation of application No. 16/150,011, filed on Oct. 2, 2018, now Pat. No. 10,270,612, which is a continuation of application No. 13/247,775, filed on Sep. 28, 2011, now abandoned.

(51) Int. Cl.
  *G06F 3/0486* (2013.01)
  *G06F 3/0488* (2013.01)
  *G06F 3/16* (2006.01)
  *G06F 16/638* (2019.01)

(56) References Cited

U.S. PATENT DOCUMENTS

| | | |
|---|---|---|
| 5,923,902 A | 7/1999 | Inagaki |
| 6,032,202 A | 2/2000 | Lea et al. |
| 6,256,554 B1 | 7/2001 | DiLorenzo |
| 6,404,811 B1 | 6/2002 | Cvetko et al. |
| 6,469,633 B1 | 10/2002 | Wachter et al. |
| 6,522,886 B1 | 2/2003 | Youngs et al. |
| 6,611,537 B1 | 8/2003 | Edens et al. |
| 6,631,410 B1 | 10/2003 | Kowalski et al. |
| 6,757,517 B2 | 6/2004 | Chang et al. |
| 6,778,869 B2 | 8/2004 | Champion |
| 7,130,608 B2 | 10/2006 | Hollstrom et al. |
| 7,130,616 B2 | 10/2006 | Janik |
| 7,143,939 B2 | 12/2006 | Henzerling |
| 7,236,773 B2 | 6/2007 | Thomas |
| 7,295,548 B2 | 11/2007 | Blank et al. |
| 7,391,791 B2 | 6/2008 | Balassanian et al. |
| 7,483,538 B2 | 1/2009 | McCarty et al. |
| 7,571,014 B1 | 8/2009 | Lambourne et al. |
| 7,630,501 B2 | 12/2009 | Blank et al. |
| 7,643,894 B2 | 1/2010 | Braithwaite et al. |
| 7,657,910 B1 | 2/2010 | McAulay et al. |
| 7,853,341 B2 | 12/2010 | McCarty et al. |
| 7,987,294 B2 | 7/2011 | Bryce et al. |
| 8,014,423 B2 | 9/2011 | Thaler et al. |
| 8,045,952 B2 | 10/2011 | Qureshey et al. |
| 8,103,009 B2 | 1/2012 | McCarty et al. |
| 8,234,395 B2 | 7/2012 | Millington |
| 8,423,893 B2 * | 4/2013 | Ramsay ............... G06F 3/0486 715/716 |
| 8,483,853 B1 | 7/2013 | Lambourne |
| 8,762,565 B2 | 6/2014 | Togashi et al. |
| 8,788,080 B1 * | 7/2014 | Kallai ............... H04R 27/00 700/94 |
| 8,938,312 B2 * | 1/2015 | Millington ............. G11B 27/10 700/94 |
| 8,942,252 B2 | 1/2015 | Balassanian et al. |
| 8,965,544 B2 | 2/2015 | Ramsay |
| 9,052,810 B2 * | 6/2015 | Reimann ............... G06F 3/0486 |
| 10,270,612 B2 * | 4/2019 | Reimann ............... G06F 3/0488 |
| 2001/0042107 A1 | 11/2001 | Palm |
| 2002/0022453 A1 | 2/2002 | Balog et al. |
| 2002/0026442 A1 | 2/2002 | Lipscomb et al. |
| 2002/0124097 A1 | 9/2002 | Isely et al. |
| 2003/0157951 A1 | 8/2003 | Hasty |
| 2004/0024478 A1 | 2/2004 | Hans et al. |
| 2007/0142944 A1 | 6/2007 | Goldberg et al. |
| 2010/0103125 A1 | 4/2010 | Kim et al. |
| 2010/0312366 A1 | 12/2010 | Madonna et al. |
| 2011/0061010 A1 | 3/2011 | Wasko |
| 2012/0017176 A1 | 1/2012 | Choi et al. |
| 2013/0094667 A1 * | 4/2013 | Millington ............ H04L 12/282 381/104 |

OTHER PUBLICATIONS

Advisory Action dated Aug. 18, 2017, issued in connection with U.S. Appl. No. 13/247,775, filed Sep. 28, 2011, 4 pages.
Advisory Action dated Sep. 25, 2014, issued in connection with U.S. Appl. No. 13/247,775, filed Sep. 28, 2016, 7 pages.
AudioTron Quick Start Guide, Version 1.0, Mar. 2001, 24 pages.
AudioTron Reference Manual, Version 3.0, May 2002, 70 pages.
AudioTron Setup Guide, Version 3.0, May 2002, 38 pages.
Bluetooth. "Specification of the Bluetooth System: The ad hoc Scatternet for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
Final Action dated Apr. 17, 2015, issued in connection with U.S. Appl. No. 13/247,775, filed Sep. 28, 2016, 20 pages.
Final Office Action dated Jul. 9, 2014, issued in connection with U.S. Appl. No. 13/247,775, filed Sep. 28, 2016, 18 pages.
Final Office Action dated Mar. 8, 2016, issued in connection with U.S. Appl. No. 13/247,775, filed Sep. 28, 2011, 27 pages.
Final Office Action dated Apr. 10, 2017, issued in connection with U.S. Appl. No. 13/247,775, filed Sep. 28, 2011, 28 pages.
Final Office Action dated May 2018, issued in connection with U.S. Appl. No. 13/247,775, filed Sep. 28, 2011, 30 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Non-Final Action dated Nov. 20, 2014, issued in connection with U.S. Appl. No. 13/247,775, filed Sep. 28, 2016, 20 pages.
Non-Final Office Action dated Mar. 7, 2014, issued in connection with U.S. Appl. No. 13/247,775, filed Sep. 28, 2016, 17 pages.
Non-Final Office Action dated Apr. 15, 2019, issued in connection with U.S. Appl. No. 16/295,390, filed Mar. 7, 2019, 7 pages.
Non-Final Office Action dated Aug. 27, 2015, issued in connection with U.S. Appl. No. 13/247,775, filed Sep. 28, 2011, 25 pages.
Non-Final Office Action dated Oct. 27, 2017, issued in connection with U.S. Appl. No. 13/247,775, filed Sep. 28, 2011, 30 pages.
Non-Final Office Action dated Sep. 29, 2016, issued in connection with U.S. Appl. No. 13/247,775, filed Sep. 28, 2016, 27 pages.
Notice of Allowance dated Dec. 10, 2018, issued in connection with U.S. Appl. No. 16/150,011, filed Oct. 2, 2018, 10 pages.
Notice of Allowance dated Jan. 21, 2020, issued in connection with U.S. Appl. No. 16/657,391, filed Oct. 18, 2019, 10 pages.
Notice of Allowance dated Jul. 29, 2019, issued in connection with U.S. Appl. No. 16/295,390, filed Mar. 7, 2019, 9 pages.
"Sonos Multi-Room Music System User Guide," Version 080501, Sonos, Inc. 2004, 218 pages.
Palm, Inc., "Handbook for the Palm VII Handheld," May 2000, 311 pages.
Pre-Appeal Brief Decision dated Jan. 11, 2019, issued in connection with U.S. Appl. No. 13/247,775, filed Sep. 28, 2011, 2 pages.
Presentations at WinHEC 2000, May 2000, 138 pages.
U.S. Appl. No. 60/490,768, filed Jul. 28, 2003, entitled "Method for synchronizing audio playback between multiple networked devices," 13 pages.
U.S. Appl. No. 60/825,407, filed Sep. 12, 2006, entitled "Controlling and manipulating groupings in a multi-zone music or media system," 82 pages.
UPnP; "Universal Plug and Play Device Architecture," 08 Jun. 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

* cited by examiner

PLAYBACK QUEUE CONTROL

CROSS REFERENCE TO RELATED APPLICATIONS

This application claims priority under 35 U.S.C. § 120 to, and is a continuation of, U.S. non-provisional patent application Ser. No. 16/295,390, filed on Mar. 7, 2019, entitled "Playback Queue Control," which is incorporated herein by reference in its entirety.

U.S. non-provisional patent application Ser. No. 16/295,390 claims priority under 35 U.S.C. § 120 to, and is a continuation of, U.S. non-provisional patent application Ser. No. 16/150,011, filed on Oct. 2, 2018, entitled "Playback Queue Control for a Zone-Based Media Playback System," and issued as U.S. Pat. No. 10,270,612 on Apr. 13, 2019, which is incorporated herein by reference in its entirety.

U.S. non-provisional patent application Ser. No. 16/295,390 claims priority under 35 U.S.C. § 120 to, and is a continuation of, U.S. non-provisional patent application Ser. No. 13/247,775, filed on Sep. 28, 2011, entitled "Methods and Apparatus To Change Control Contexts of Controllers," which is incorporated herein by reference in its entirety.

FIELD OF THE DISCLOSURE

The disclosure is related to consumer electronics and, more particularly, to methods and apparatus to change control contexts of controllers.

BACKGROUND

Technological advancements have increased the accessibility of music content, as well as other types of media, such as television content, movies, and interactive content. For example, a user can access audio, video, or both audio and video content over the Internet through an online store, an Internet radio station, an online music service, an online movie service, and the like, in addition to the more traditional avenues of accessing audio and video content. Demand for such audio and video content continues to surge. Given the high demand, technology used to access and play such content has likewise improved.

BRIEF DESCRIPTION OF THE DRAWINGS

Features, aspects, and advantages of the presently disclosed technology are better understood with regard to the following description, appended claims, and accompanying drawings where:

Figure 1:
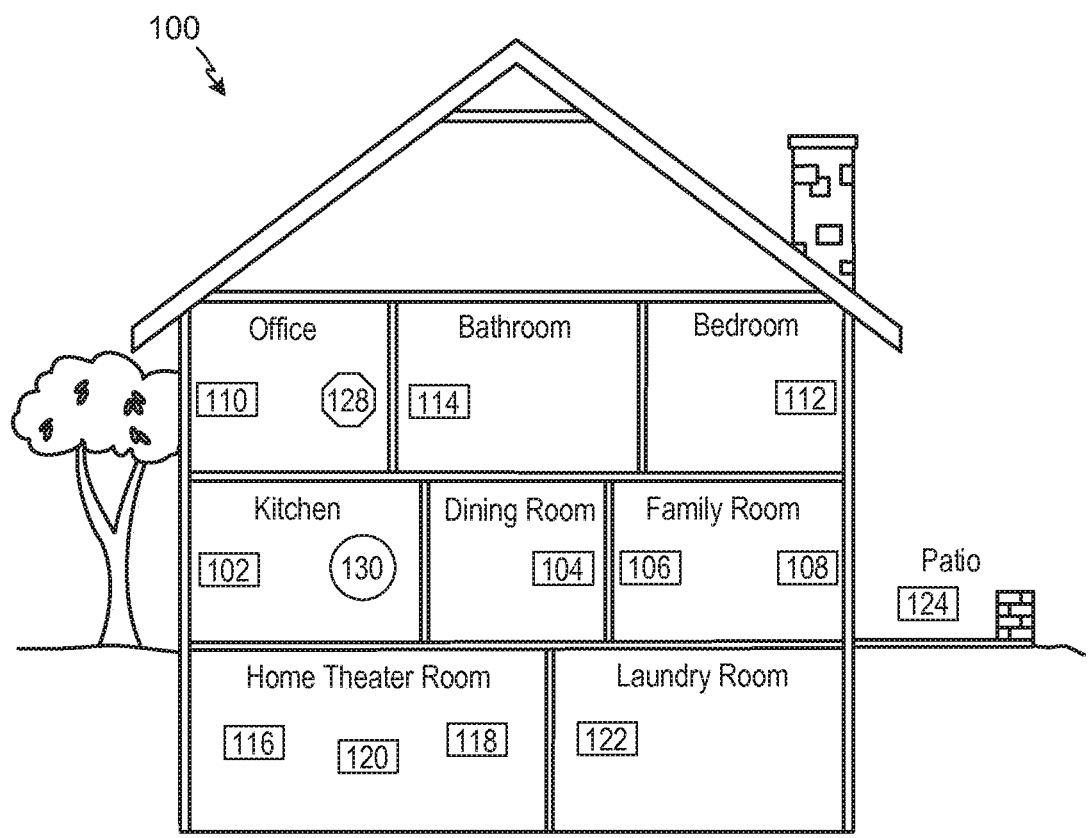
FIG. 1 shows an illustration of an example system in which embodiments of the methods and apparatus disclosed herein may be implemented.

In addition, the drawings are for the purpose of illustrating example embodiments, but it is understood that the present disclosure is not limited to the arrangements and instrumentality shown in the drawings.

DETAILED DESCRIPTION

I. Overview

Embodiments of the methods and apparatus disclosed herein enable a user to easily and conveniently change control contexts of a controller.

An example embodiment of an apparatus implemented in accordance with the present disclosure includes a touch screen to display a user interface; a controller to control a first physical playback device of a first zone when in a first control context and to control a second physical playback device of a second zone when in a second control context; a swipe detector to monitor a designated area of a user interface for a swipe of the touch screen; and a context changer to change the controller from operating in the first control context to operating in the second control context in response to a detected swipe.

In some embodiments, the apparatus further includes a user interface communicator to facilitate a change in a display of the designated area in response to the detected swipe.

In some embodiments, the display includes information related to a currently selected media item in the first or second zone.

In some embodiments, the display includes an identifier of the first zone when in the first control context.

In some embodiments, the user interface includes an indicator reflective of a list of control contexts in which the controller operates.

In some embodiments, the first and second physical playback devices are playback devices capable of generating a media presentation.

In some embodiments, the first and second zones are part of an in-home whole house media system.

An example method implemented in accordance with the present disclosure includes monitoring a designated area of a user interface for a swipe of a touch screen; and changing a controller from operating in a first control context to operating in a second control context in response to a detected swipe, wherein the controller controls a first physical playback device of a first zone when in the first control context, and wherein the controller controls a second physical playback device of a second zone when in the second control context.

In some embodiments, the method further includes facilitating a change in a display of the designated area in response to the detected swipe.

In some embodiments, the display includes information related to a currently selected media item in the first or second zone.

In some embodiments, the display includes an identifier of the first zone when in the first control context.

In some embodiments, the user interface includes an indicator reflective of a list of control contexts in which the controller operates.

In some embodiments, the first and second physical playback devices are playback devices capable of generating a media presentation.

In some embodiments, the first and second zones are part of an in-home whole house media system.

An example tangible machine-readable medium has instructions stored thereon implemented in accordance with the present disclosure that cause a machine to at least monitor a designated area of a user interface for a swipe of a touch screen; and change a controller from operating in a first control context to operating in a second control context in response to a detected swipe, wherein the controller controls a first physical playback device of a first zone when in the first control context, and wherein the controller controls a second physical playback device of a second zone when in the second control context.

In some embodiments, the instructions cause the machine to facilitate a change in a display of the designated area in response to the detected swipe.

In some embodiments, the display includes information related to a currently selected media item in the first or second zone.

In some embodiments, the display includes an identifier of the first zone when in the first control context.

In some embodiments, the first and second physical playback devices are playback devices capable of generating a media presentation.

In some embodiments, the first and second zones are part of an in-home whole house media system.

Although the following discloses example methods, apparatus, systems, and articles of manufacture including, among other components, firmware and/or software executed on hardware, it should be noted that such methods, apparatus, systems, and/or articles of manufacture are merely illustrative and should not be considered as limiting. For example, it is contemplated that any or all of these firmware, hardware, and/or software components could be embodied exclusively in hardware, exclusively in software, exclusively in firmware, or in any combination of hardware, software, and/or firmware. Accordingly, while the following describes example methods, apparatus, systems, and/or articles of manufacture, the examples provided are not the only way(s) to implement such methods, apparatus, systems, and/or articles of manufacture.

When any of the appended claims are read to cover a purely software and/or firmware implementation, at least one of the elements in at least one example is hereby expressly defined to include a tangible medium such as a memory, DVD, CD, Blu-ray, etc., storing the software and/or firmware.

These embodiments and many additional embodiments are described more below. Further, the detailed description is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure may be practiced without certain, specific details. In other instances, well known methods, procedures, components, and circuitry have not been described in detail to avoid unnecessarily obscuring aspects of the embodiments.

Reference herein to "embodiment" means that a particular feature, structure, or characteristic described in connection with the embodiment can be included in at least one example embodiment of the invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, may be combined with other embodiments.

II. Example Environment

Referring now to the drawings, in which like numerals may refer to like parts throughout the figures. FIG. 1 shows an example system configuration 100 in which one or more of the method and/or apparatus disclosed herein may be practiced or implemented. By way of illustration, the system configuration 100 represents a home with multiple zones. Each zone, for example, represents a different room or space, such as an office, bathroom, bedroom, kitchen, dining room, family room, home theater room, utility or laundry room, and patio. While not shown here, a single zone may cover more than one room or space. One or more of zone players 102-124 are shown in each respective zone. A zone player 102-124, also referred to as a playback device, multimedia unit, speaker, etc., provides audio, video, and/or audiovisual output. A controller 130 (e.g., shown in the kitchen for purposes of illustration) provides control to the system configuration 100. The system configuration 100 illustrates an example whole house audio system, though it is understood that the technology described herein is not limited to its particular place of application or to an expansive system like a whole house audio system 100 of FIG. 1.

Figure 2A:
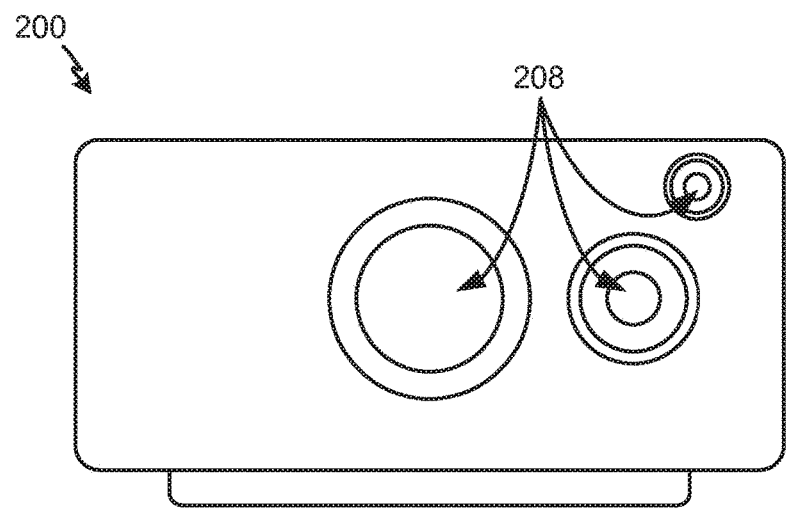
FIG. 2A shows an illustration of an example zone player having a built-in amplifier and speakers.
Figure 2B:
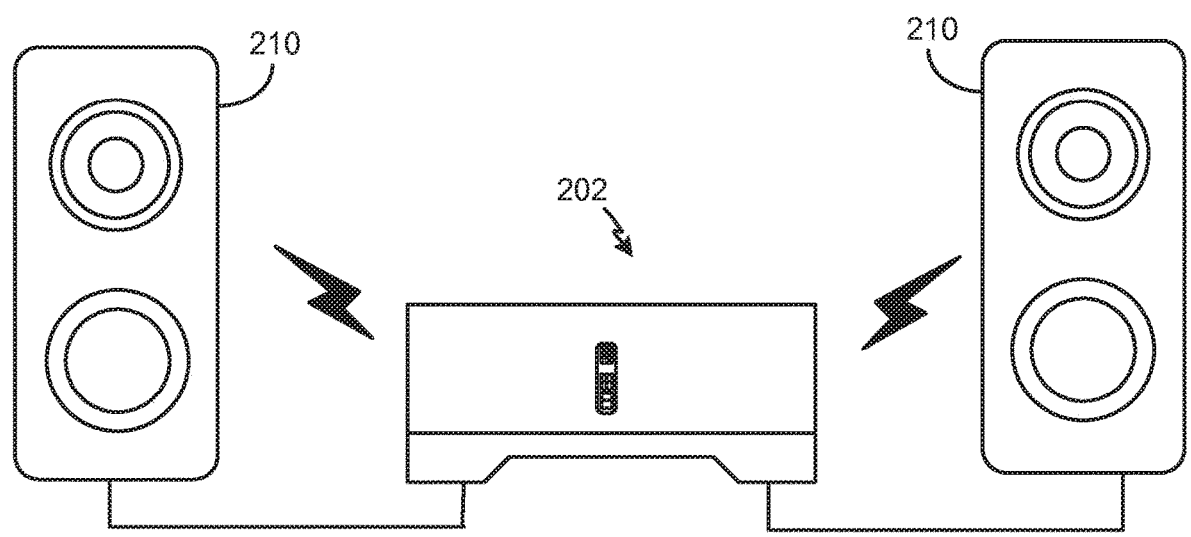
FIG. 2B shows an illustration of an example zone player having a built-in amplifier and connected to external speakers.
Figure 2C:
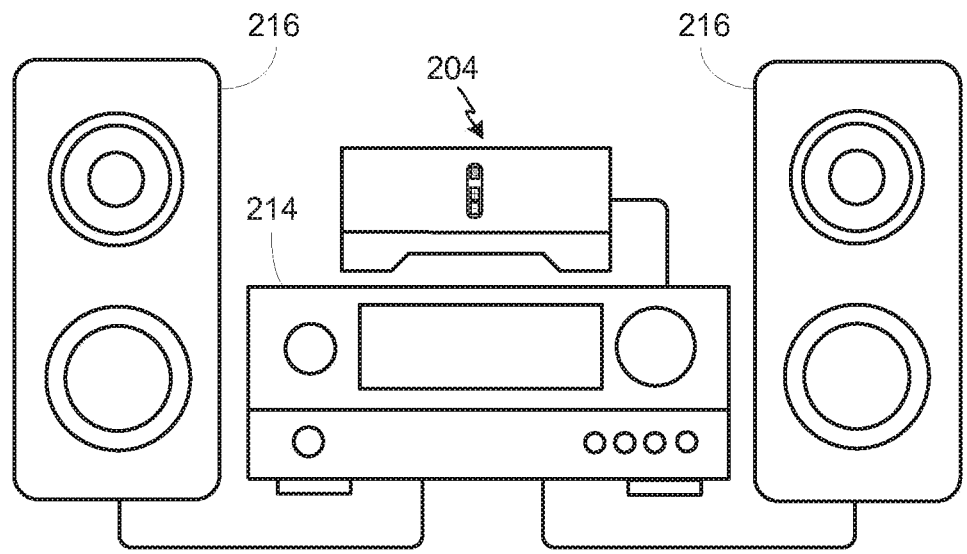
FIG. 2C shows an illustration of an example zone player connected to an A/V receiver and speakers.

FIGS. 2A, 2B, and 2C show example illustrations of zone players 200-204. The zone players 200-204 of FIGS. 2A, 2B, and 2C, respectively, may correspond to any of the zone players 102-124 of FIG. 1. While certain embodiments provide multiple zone players, an audio output may be generated using only a single zone player. FIG. 2A illustrates a zone player 200 including sound producing equipment 208 capable of generating sound or an audio output corresponding to a signal received (e.g., wirelessly and/or via a wired interface). The sound producing equipment 208 of the zone player 200 of FIG. 2A includes a built-in amplifier (not shown in this illustration) and speakers (e.g., a tweeter, a mid-range driver, and/or a subwoofer. In certain embodiments, the zone player 200 of FIG. 2A may be configured to play stereophonic audio or monaural audio. As described in greater detail below, in some embodiments, the example zone player 200 of FIG. 2A can also transmit a second signal to, for example, other zone player(s) in the same or different zone(s), speaker(s), receiver(s), etc. Transmission of the second signal may be part of, for example, a system in which multiple zone players, speakers, receivers, etc. form a network to, for example, present media content in a synchronization or distributed manner.

The example zone player 202 of FIG. 2B includes a built-in amplifier (not shown in this illustration) to power a set of detached speakers 210. The speakers 210 of FIG. 2B may include, for example, any type of loudspeaker. The zone player 202 of FIG. 2B can communicate a signal corresponding to audio content to the detached speakers 210 via wired and/or wireless channels. Instead of receiving and generating audio content as in FIG. 2A, the zone player 202 of FIG. 2B receives the audio content and transmits the same (e.g., after processing the received signal) to the detached speakers 210. Similar to the example zone player 200 of FIG. 2A, in some embodiments the zone player 202 can transmit a second signal to, for example, other zone player(s) in the same or different zone(s), speaker(s), receiver(s), etc.

The example zone player 204 of FIG. 2C does not include an amplifier, but allows a receiver 214, or another audio and/or video type device with built-in amplification, to connect to a data network 128 of FIG. 1 and to play audio received over the data network 128 via the receiver 214 and a set of detached speakers 216. In addition to the wired couplings shown in FIG. 2C, the detached speakers 216 can receive audio content via a wireless communication channel between the detached speakers 216 and, for example, the zone player 204 and/or the receiver 214. In some embodiments the zone player 202 can transmit a second signal to, for example, other zone player(s) in the same or different zone(s), speaker(s), receiver(s), etc.

Example zone players include a "Sonos® S5," "Sonos Play:5," "ZonePlayer 120," and "ZonePlayer 90," which are offered by Sonos, Inc. of Santa Barbara, Calif. A zone player may also be referred to herein as a playback device, and a zone player is not limited to the particular examples illustrated in FIGS. 2A, 2B, and 2C. For example, a zone player may include a wired or wireless headphone. In another example, a zone player might include a subwoofer. In an example, a zone player may include or interact with a docking station for an Apple iPod™ or similar device. In some embodiments, a zone player may relay one or more signals received from, for example, a first zone player to another playback device. In some embodiments, a zone player may receive a first signal and generate an output corresponding to the first signal and, simultaneously or separately, may receive a second signal and transmit or relay the second signal to another zone player(s), speaker(s), receiver(s), etc. Thus, an example zone player described herein can act as a playback device and, at the same time, operate as a hub in a network of zone players. In such instances, media content corresponding to the first signal may be different from the media content corresponding to the second signal.

Figure 3:
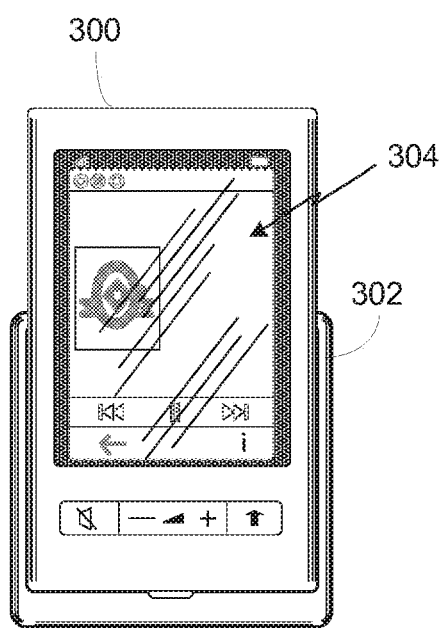
FIG. 3 shows an illustration of an example controller.

FIG. 3 shows an example illustration of a wireless controller 300 in a docking station 302. The controller 300 may correspond to the controlling device 130 of FIG. 1. The controller 300 is provided with a touch screen 304 that allows a user to interact with the controller 300 to, for example, retrieve and navigate a playlist of audio items, control operations of one or more zone players, and provide overall control of the system configuration 100. In certain embodiments, any number of controllers may be used to control the system configuration 100. In certain embodiments, there may be a limit on the number of controllers that can control the system configuration 100. The controllers might be wireless like wireless controller 300 or wired to the data network 128. Furthermore, an application running on any network-enabled portable devices, such as an iPhone™, iPad™, Android™ powered phone, or any other smart phone or network-enabled device may be used as a controller by connecting to the data network 128. An application running on a laptop or desktop PC or Mac may also be used as a controller. Example controllers include a "Sonos® Controller 200," "Sonos® Controller for iPhone," "Sonos® Controller for iPad," "Sonos® Controller for Android, "Sonos® Controller for Mac or PC," which are offered by Sonos, Inc. of Santa Barbara, Calif. The flexibility of such an application and its ability to be ported to a new type of portable device is advantageous.

Referring back to the system configuration 100 of FIG. 1, a particular zone may contain one or more zone players. For example, the family room of FIG. 1 contains two zone players 106 and 108, while the kitchen is shown with one zone player 102. Zones may be dynamically configured by positioning a zone player in a room or space and assigning via the controller 130 the zone player to a new or existing zone. As such, zones may be created, combined with another zone, removed, and given a specific name (e.g., "Kitchen"), if so programmed. The zone players 102 to 124 are coupled directly or indirectly to a data network, such as the data network 128 shown in FIG. 1. The data network 128 is represented by an octagon in the figure to stand out from other components shown in the figure. While the data network 128 is shown in a single location, it is understood that such a network may be distributed in and around the system configuration 100.

Particularly, the data network 128 may be a wired network, a wireless network, or a combination of both. In some embodiments, one or more of the zone players 102-124 are wirelessly coupled to the data network 128 based on a proprietary mesh network. In some embodiments, one or more of the zone players 102-124 are wirelessly coupled to the data network 128 using a non-mesh topology. In some embodiments, one or more of the zone players 102-124 are coupled via a wire to the data network 128 using Ethernet or similar technology. In addition to the one or more zone players 102-124 connecting to the data network 128, the data network 128 may further allow access to a wide area network, such as the Internet.

In certain embodiments, the data network 128 may be created by connecting any of the zone players 102-124, or some other connecting device, to a broadband router. Other zone players 102-124 may then be added wired or wirelessly to the data network 128. For example, a zone player (e.g., any of zone players 102-124) may be added to the system configuration 100 by simply pressing a button on the zone player itself, which enables a connection to be made to the data network 128. The broadband router may be connected to an Internet Service Provider (ISP), for example. The broadband router may be used to form another data network within the system configuration 100, which may be used in other applications (e.g., web surfing). The data network 128 may also be used in other applications, if so programmed. Further, in certain embodiments, the data network 128 is the same network used for other applications in the household.

In certain embodiments, each zone can play from the same audio source as another zone or each zone can play from a different audio source. For example, someone can be grilling on the patio and listening to jazz music via zone player 124, while someone is preparing food in the kitchen and listening to classical music via zone player 102. Further, someone can be in the office listening to the same jazz music via zone player 110 that is playing on the patio via zone player 124. In some embodiments, the jazz music played via zone players 110 and 124 is played in synchrony. Synchronizing playback amongst zones allows for someone to pass through zones while seamlessly listening to the audio. Further, zones may be put into a "party mode" such that all associated zones will play audio in synchrony.

In certain embodiments, a zone contains two or more zone players. For example, the family room contains two zone players 106 and 108, and the home theater room contains at least zone players 116, 118, and 120. A zone may be configured to contain as many zone players as desired, and for example, the home theater room might contain additional zone players to play audio from a 5.1 channel or greater audio source (e.g., a movie encoded with 5.1 or greater audio channels). If a zone contains two or more zone players, such as the two zone players 106 and 108 in the family room, then the two zone players 106 and 108 may be configured to play the same audio source in synchrony, or the two zone players 106 and 108 may be paired to play two separate sounds in left and right channels, for example. In other words, the stereo effects of a sound may be reproduced or enhanced through the two zone players 106 and 108, one for the left sound and the other for the right sound. In certain embodiments, paired zone players may play audio in synchrony with other zone players.

In certain embodiments, three or more zone players may be configured to play various channels of audio that is encoded with three channels or more sound. For example, the home theater room shows zone players 116, 118, and 120. If the sound is encoded as 2.1 channel audio, then the zone player 116 may be configured to play left channel audio, the zone player 118 may be configured to play right channel audio, and the zone player 120 may be configured to play bass frequencies. Other configurations are possible and depend on the number of zone players and the type of audio. Further, a particular zone may be configured to play a 5.1 channel audio in one instance, such as when playing audio from a movie, and then dynamically switch to play stereo, such as when playing audio from a two channel source.

In certain embodiments, two or more zone players may be sonically consolidated to form a single, consolidated zone player. A consolidated zone player (though made up of multiple, separate devices) may be configured to process and reproduce sound differently than an unconsolidated zone player or zone players that are paired, because a consolidated zone player will have additional speaker drivers from which sound may be passed. The consolidated zone player may further be paired with a single zone player or yet another consolidated zone player. Each playback device of a consolidated playback device is preferably set in a consolidated mode.

According to some embodiments, one can continue to do any of: group, consolidate, and pair zone players, for example, until a desired configuration is complete. The actions of grouping, consolidation, and pairing are preferably performed through a control interface, such as using controller 130, and not by physically connecting and re-connecting speaker wire, for example, to individual, discrete speakers to create different configurations. As such, certain embodiments described herein provide a more flexible and dynamic platform through which sound reproduction can be offered to the end-user.

Sources of audio content to be played by zone players 102-124 are numerous. Music from a personal library stored on a computer or networked-attached storage (NAS) may be accessed via the data network 128 and played. Internet radio stations, shows, and podcasts may be accessed via the data network 128. Music services that let a user stream and download music and audio content may be accessed via the data network 128. Further, music may be obtained from traditional sources, such as a turntable or CD player, via a line-in connection to a zone player, for example. Audio content may also be accessed through AirPlay™ wireless technology by Apple, Inc., for example. Audio content received from one or more sources may be shared amongst the zone players 102 to 124 via the data network 128 and/or the controller 130.

III. Example Playback Device

Figure 4:
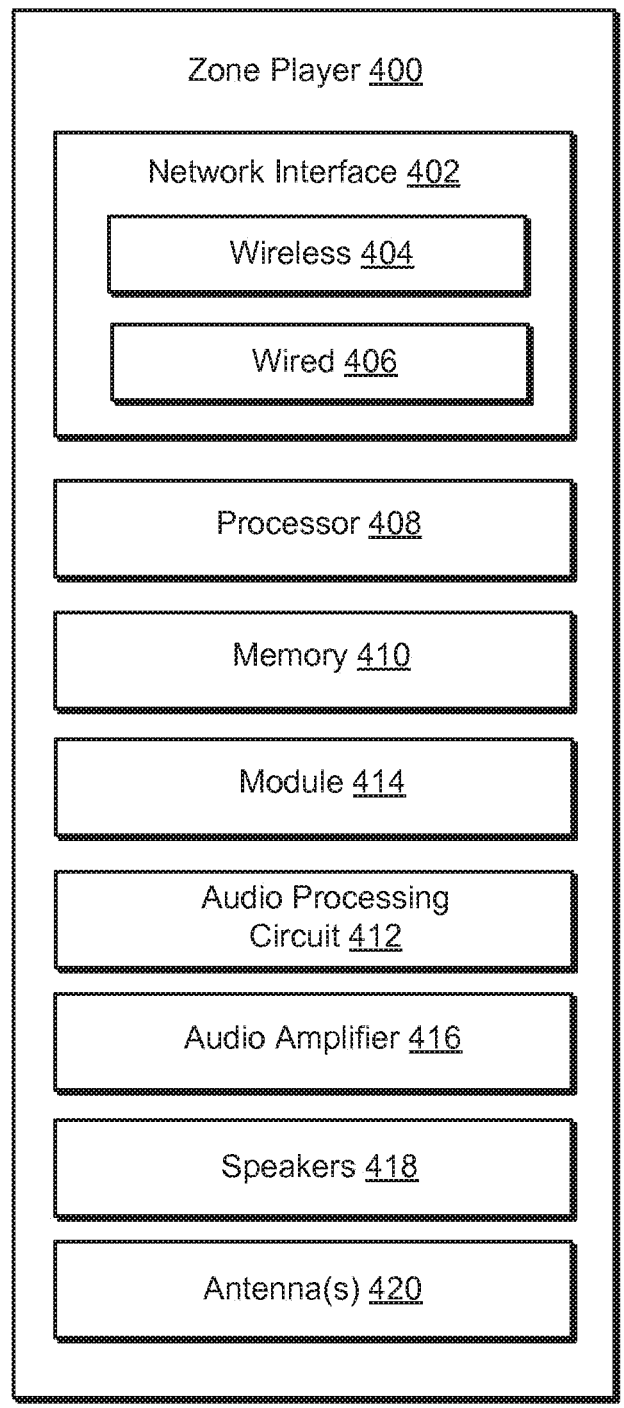
FIG. 4 shows an internal functional block diagram of an example zone player.

Referring now to FIG. 4, there is shown an example functional block diagram of a zone player 400 in accordance with an embodiment. The zone player 400 of FIG. 4 includes a network interface 402, a processor 408, a memory 410, an audio processing component 412, a module 414, an audio amplifier 416, and a speaker unit 418 coupled to the audio amplifier 416. FIG. 2A shows an example illustration of such a zone player. Other types of zone players may not include the speaker unit 418 (e.g., such as shown in FIG. 2B) or the audio amplifier 416 (e.g., such as shown in FIG. 2C). Further, it is contemplated that the zone player 400 may be integrated into another component. For example, the zone player 400 could be constructed as part of a lamp for indoor or outdoor use.

Referring back to FIG. 4, the network interface 402 facilitates a data flow between zone players and other devices on a data network (e.g., the data network 128 of FIG. 1) and the zone player 400. In some embodiments, the network interface 402 may manage the assembling of an audio source or file into smaller packets that are to be transmitted over the data network or reassembles received packets into the original source or file. In some embodiments, the network interface 402 may further handle the address part of each packet so that it gets to the right destination or intercepts packets destined for the zone player 400. Accordingly, in certain embodiments, each of the packets includes an Internet Protocol (IP)-based source address as well as an IP-based destination address.

In some embodiments, the network interface 402 may include one or both of a wireless interface 404 and a wired interface 406. The wireless interface 404, also referred to as an RF interface, provides network interface functions for the zone player 400 to wirelessly communicate with other devices (e.g., other zone player(s), speaker(s), receiver(s), component(s) associated with the data network 128, etc.) in accordance with a communication protocol (e.g., any of the wireless standards IEEE 802.11a, 802.11b, 802.11g, 802.11n, or 802.15). To receive wireless signals and to provide the wireless signals to the wireless interface 404 and to transmit wireless signals, the zone player 400 of FIG. 4 includes one or more antennas 420. The antenna(s) 420 are discussed in greater detail below in connection with FIGS. 6A and 6B. The wired interface 406 provides network interface functions for the zone player 400 to communicate over a wire with other devices in accordance with a communication protocol (e.g., IEEE 802.3). In some embodiments, a zone player includes both of the interfaces 404 and 406. In some embodiments, a zone player 400 includes only the wireless interface 404 or the wired interface 406.

In some embodiments, the processor 408 is a clock-driven electronic device that is configured to process input data according to instructions stored in memory 410. The memory 410 is data storage that may be loaded with one or more software modules 414, which can be executed by the processor 408 to achieve certain tasks. In the illustrated embodiment, the memory 410 is a tangible machine readable medium storing instructions that can be executed by the processor 408. In some embodiments, a task might be for the zone player 400 to retrieve audio data from another zone player or a device on a network. In some embodiments, a task might be for the zone player 400 to send audio data to another zone player or device on a network. In some embodiments, a task might be for the zone player 400 to synchronize playback of audio with one or more additional zone players. In some embodiments, a task might be to pair the zone player 400 with one or more zone players to create a multi-channel audio environment. Additional or alternative tasks may be achieved via the one or more software modules 414 and the processor 408.

The audio processing component 412 may include one or more digital-to-analog converters (DAC), an audio preprocessing component, an audio enhancement component or a digital signal processor, and so on. In certain embodiments, the audio that is retrieved via the network interface 402 is processed and/or intentionally altered by the audio processing component 210. Further, the audio processing component 412 may produce analog audio signals. The processed analog audio signals are then provided to the audio amplifier 416 for play back through speakers 418. In addition, the audio processing component 412 may include necessary circuitry to process analog or digital signals as inputs to play from zone player 400, send to another zone player on a network, or both play and send to another zone player on the network. An example input includes a line-in connection (e.g., an auto-detecting 3.5 mm audio line-in connection).

The audio amplifier 416 is a device that amplifies audio signals to a level for driving one or more speakers 418. The one or more speakers 418 may include an individual transducer (e.g., a "driver") or a complete speaker system that includes an enclosure including one or more drivers. A particular driver may be a subwoofer (for low frequencies), a mid-range driver (middle frequencies), and a tweeter (high frequencies), for example. An enclosure may be sealed or ported, for example.

A zone player 400 may also be referred to herein as a playback device. An example playback device includes a Sonos® S5, which is manufactured by Sonos, Inc. of Santa Barbara, Calif. The S5 is an example zone player with a built-in amplifier and speakers. In particular, the S5 is a five-driver speaker system that includes two tweeters, two mid-range drivers, and one subwoofer. When playing audio content via the S5, the left audio data of a track is sent out of the left tweeter and left mid-range driver, the right audio data of a track is sent out of the right tweeter and the right mid-range driver, and mono bass is sent out of the subwoofer. Further, both mid-range drivers and both tweeters have the same equalization (or substantially the same equalization). That is, they are both sent the same frequencies, just from different channels of audio. Audio from Internet radio stations, online music and video services, downloaded music, analog audio inputs, television, DVD, and so on may be played from a Sonos® S5. While the S5 is an example of a zone player with speakers, it is understood that a zone player with speakers is not limited to one with a certain number of speakers (e.g., five speakers as in the S5), but rather can contain one or more speakers. Further, a zone player may be part of another device, which might even serve a purpose different than audio (e.g., a lamp).

IV. Example Controller

Figure 5:
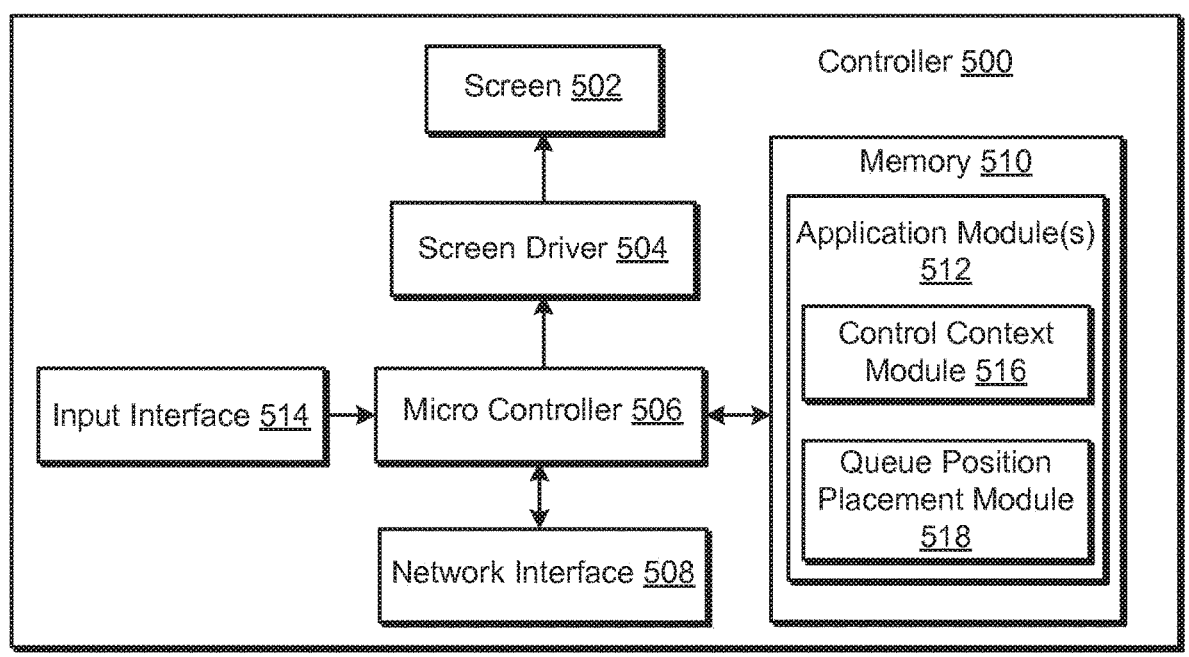
FIG. 5 shows an internal functional block diagram of an example controller.

Referring now to FIG. 5, there is shown an example controller 500, which may correspond to the controlling device 130 in FIG. 1. The controller 500 may be used to facilitate the control of multi-media applications, automation and others in a system. In particular, the controller 500 is configured to facilitate a selection of a plurality of audio sources available on the network and enable control of one or more zone players (e.g., the zone players 102-124 in FIG. 1) through a wireless network interface 508. According to one embodiment, the wireless communication is based on an industry standard (e.g., infrared, radio, wireless standards IEEE 802.11a, 802.11b 802.11g, 802.11n, or 802.15). Further, when a particular audio is being accessed via the controller 500 or being played via a zone player, a picture (e.g., album art) or any other data, associated with the audio source may be transmitted from a zone player or other electronic device to the controller 500 for display.

The controller 500 is provided with a screen 502 and an input interface 514 that allows a user to interact with the controller 500, for example, to navigate a playlist of many multimedia items and to control operations of one or more zone players. The screen 502 on the controller 500 may be an LCD screen or a touchscreen, for example. The screen 500 communicates with and is commanded by a screen driver 504 that is controlled by a microcontroller (e.g., a processor) 506.

The controller 500 includes a network interface 508 that facilitates wireless communication with a zone player. In some embodiments, the commands such as volume control and audio playback synchronization are sent via the network interface 508. In some embodiments, a saved zone group configuration is transmitted between a zone player and a controller via the network interface 508. There may be more than one controller for a particular system. Further, a controller may be integrated into a zone player.

In certain embodiments, a user may create a zone group including at least two zone players from the controller 500. The zone players in the zone group may play audio in a synchronized fashion, such that all of the zone players in the zone group play back an identical audio source or a list of identical audio sources in a synchronized manner such that no (or substantially no) audible delays or hiccups could be heard. Similarly, in some embodiments, when a user increases the audio volume of the group from the controller 500, the signals or data of increasing the audio volume for the group are sent to one of the zone players and causes other zone players in the group to be increased together in volume.

A user via the controller 500 may group zone players into a zone group by activating a "Link Zones" or "Add Zone" soft button, or de-grouping a zone group by activating an "Unlink Zones" or "Drop Zone" button. For example, one mechanism for 'joining' zone players together for audio play back is to link a number of zone players together to form a group. To link a number of zone players together, a user may manually link each zone player or room one after the other. For example, assume that there is a multi-zone system that includes the following zones: Bathroom, Bedroom, Den, Dining Room, Family Room, and Foyer.

In certain embodiments, a user can link any number of zone players (e.g., the zone players 102-124 of FIG. 1), for example, by starting with a single zone and then manually linking each zone to that zone. In certain embodiments, a set of zones can be dynamically linked together using a command to create a zone scene or theme (subsequent to first creating the zone scene). For instance, a "Morning" zone scene command may link the Bedroom, Office, and Kitchen zones together in one action. Without this single command, the user would need to manually and individually link each zone. The single command might include a mouse click, a double mouse click, a button press, a gesture, or some other programmed action. Other kinds of zone scenes may be programmed.

In certain embodiments, a zone scene may be triggered based on time (e.g., an alarm clock function). For instance, a zone scene may be set to apply at 8:00 am. The system can link appropriate zones automatically, set specific music to play, and then stop the music after a defined duration. Although any particular zone may be triggered to an "On" or "Off" state based on time, for example, a zone scene enables any zone(s) linked to the scene to play a predefined audio (e.g., a favorable song, a predefined playlist) at a specific time and/or for a specific duration. If, for any reason, the scheduled music failed to be played (e.g., an empty playlist, no connection to a share, failed Universal Plug and Play (UPnP), no Internet connection for an Internet Radio station, etc.), a backup buzzer may be programmed to sound. The buzzer may include a sound file that is stored in a zone player, for example.

The memory 510 may be loaded with one or more application modules 512 that can be executed by the microcontroller 506 with or without a user input via the user interface 514 to achieve certain tasks. In operation, when the microcontroller 506 executes one or more of the application modules 512, the screen driver 504 generates control signals to drive the screen 502 to display an application specific user interface accordingly. In some embodiments, a first one of the application module(s) 512 is configured to facilitate grouping a number of selected zone players into a zone group and synchronizing the zone players for audio play back. In some embodiments, a second one of the application module(s) 512 is configured to control the audio sounds (e.g., volume) of the zone players in a zone group.

In the illustrated example of FIG. 5, the application module(s) 512 include a control context module 516 constructed in accordance with the teachings of this disclosure. The example control context module 516 manages a plurality of control contexts, each corresponding to a mode in which the controller 500 controls a specific zone or zone group. For example, the control context module 516 manages a first control context for the controller 500 in which the controller 500 is configured to control (e.g., determine which media is output by a corresponding playback device) a first zone defined to include the patio of the example system 100 of FIG. 1. At the same time, the control context module 516 manages a second control context for the controller 500 in which the controller 500 is configured to control (e.g., determine which media is output by a corresponding playback device) a second zone defined to include the family room of the example system 100 of FIG. 1. The example control context module 516 implements a user interface (or a portion thereof) to be displayed on the screen 502 and detects a change in the control contexts (e.g., communicated to the controller 500 via the input interface 514) made by a user via the user interface. In response, the example control context module 516 configures the controller 500 to operate in a selected control context. In doing so, the control context module 516 determines which physical devices (e.g., zone players and/or playback devices) of the example system 100 are currently controlled by the controller 500. In other words, using the control context module 516 of FIG. 5, the controller 500 controls one or more zone players, such as the zone players 102-124 of FIG. 1, depending on which control context the controller 500 a user has selected. The example control context module 516 is described in detail below in connection with FIGS. 6-9.

In the illustrated example of FIG. 5, the application module(s) 512 also include a queue position placement (QPP) module 518 constructed in accordance with the teachings of this disclosure. The example QPP module 518 manages a location at which a media item is positioned within a queue when being added to the queue. The example QPP module 518 provides a user interface (or at least a portion thereof) with a plurality of drop zones into which a media item (e.g., an icon representing a media item) can be dragged and dropped. Each of the drop zones defines a position in which a queue that the media item is to be placed when the media item is dropped into the respective drop zone. Thus, depending on which of the drop zones the media item is dropped, the example QPP module 518 places the media item in the queue in a corresponding position. The example QPP module 518 is described in detail below in connection with FIGS. 10-17.

It should be noted that other network-enabled devices such as an iPhone®' iPad® or any other smart phone or network-enabled device (e.g., a networked computer such as a PC or Mac® may also be used as a controller) may be used as a controller to interact or control zone players in a particular environment. In such instances, the application module(s) 512, including the example control context module 516 and/or the example QPP module 518, may be implemented in connection with an application or program downloaded or otherwise executed by the network enabled device(s) (e.g., an iPhone® iPad® or any other smart phone or network-enabled device). In some embodiments, a software application or upgrade may be downloaded onto a network enabled device to perform the functions disclosed herein.

V. Changing a Control Context on a Controller

Figure 6:
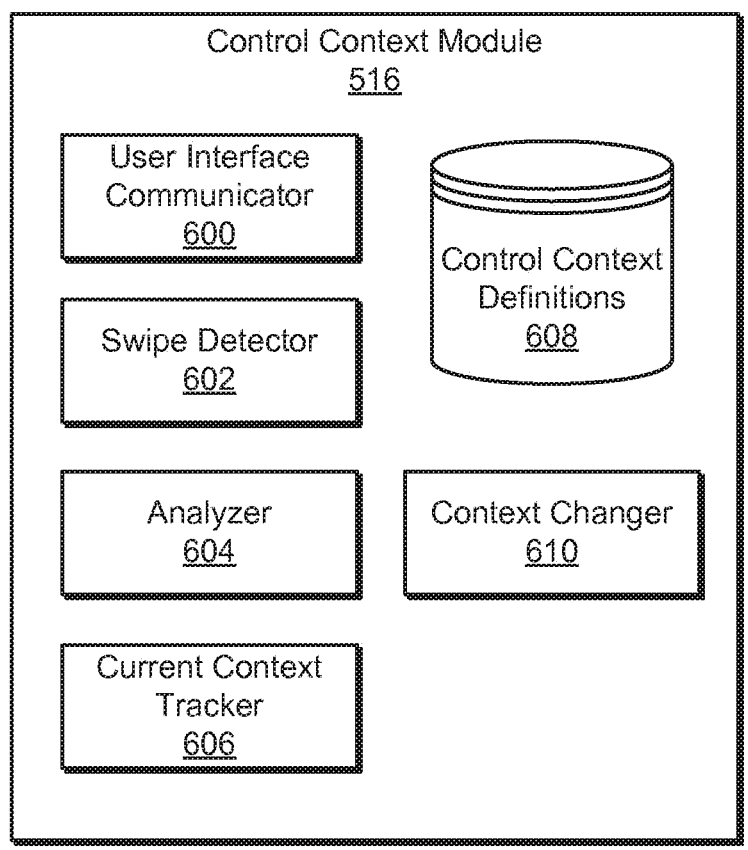
FIG. 6 shows an internal functional block diagram of an example implementation of the control context module of FIG. 5.

An example apparatus that may be used to implement the example control context module 516 of FIG. 5 is illustrated in FIG. 6. Generally, the example control context module 516 of FIG. 6 enables a user of a touch screen interface to quickly and efficiently change between control contexts of a controller (e.g., the example controller 500 of FIG. 5) associated with the control context module 516. In other words, the example control context module 516 of FIG. 6 enables the user of the touch screen interface to quickly and efficiently change which of a plurality of zones and/or devices are controlled by the controller 500. In previous systems, the user was required to navigate through multiple screens and make multiple selections to make such a change (if available). The example control context module 516 disclosed herein provides a mechanism and/or technique that alters a control context of the controller 500 using a single swipe of a designated area of a touch screen of the controller 500. Thus, with a single interaction with the screen 502 of the controller 500, the control context module 516 disclosed herein changes which physical devices (e.g., zone player(s) and/or playback device(s)) are controlled by the controller 500.

Figure 7:
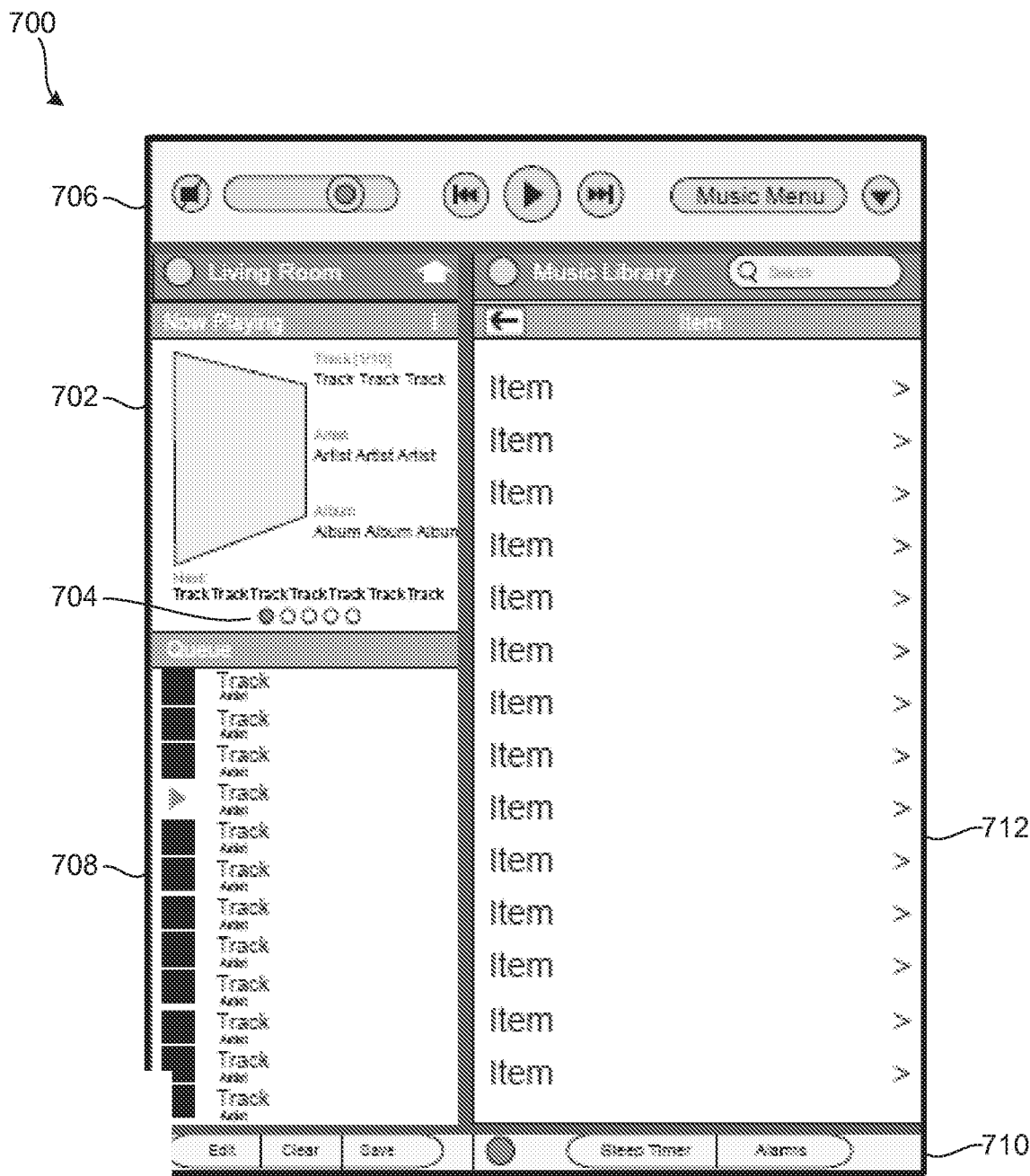
FIG. 7 is a screenshot of an example user interface associated with the example control context module of FIGS. 5 and/or 6.

The example control context module 516 of FIG. 6 includes a user interface communicator 600. The user interface communicator 600 interacts with or may be integrated with a user interface of the controller 500, such as a user interface providing input to the input interface 514 of FIG. 5. The user interface communicator 600 enables the control context module 516 to receive information regarding such inputs. Additionally or alternatively, the user interface communicator 600 designates a portion of a display to be presented on the screen 502 to be associated with the control context module 516. In the illustrated example, the user interface communicator 600 designates a Now Playing section of a user interface implemented by the controller 500 for an input that would change the control context of the controller 500. FIG. 7 is a screenshot 700 of an example user interface that may be implemented by the controller 500 and/or into which the user interface communicator 600 of FIG. 6 may be integrated. The example Now Playing section 702 of FIG. 7 includes information related to a media presentation (e.g., output of an audio track) being presented in a particular zone of, for example, the system 100 of FIG. 1. That is, the Now Playing section 702 describes (e.g., via information related to metadata) media that is playing in a zone (e.g., the living room of the system 100 of FIG. 1). A name of the current zone is displayed in the Now Playing section 702. In FIG. 7, the current zone is named Living Room.

The user interface communicator 600 receives information related to interactions between a user and the Now Playing section 702 and provides the received information to a swipe detector 602. The swipe detector 602 interprets information received via the user interface communicator 600 to determine whether the user has swiped the touch screen. Such an input is understood by the user to change control contexts of the controller 500. As described above, a control context refers to a mode of the controller 500 indicative of which of a plurality of physical devices (e.g., zone players and/or playback devices) are currently controlled by the controller 500. The control context in which the controller 500 is in at a give point in time is reflected in the Now Playing section 702. When a user wants to, for example, configure a zone not associated with a current control context (e.g., a different zone than the Living Room zone shown in FIG. 7), the user performs a swiping motion in the Now Playing section 702 to enter the controller 500 into a control context associated with the zone to be configured. The swipe detector 602 is capable of detecting such a swipe and in which direction (e.g., right or left) the swipe occurred.

When the swipe detector 602 determines that a swipe has occurred in the Now Playing section 702 (e.g., based on information received via the user interface communicator 600), the swipe detector informs an analyzer 604 that a swipe has occurred and provides a direction of the swipe to the analyzer 604. The example analyzer 604 determines which control context the controller 500 was in prior to the detected swipe by referencing a current context tracker 606. The current context tracker 606 may be a memory location that indicates which control context the controller 500 is in and, thus, which zone of the system 100 is currently being controlled by the controller 500. The example current context tracker 606 includes an identifier of which zone the controller 500 is currently controlling. However, the information defining which physical devices (e.g., zone players and/or playback devices) are in each zone or control context is stored in a control context definitions database 608. The example database 608 also includes an order in which the control contexts are to be displayed on the user interface of the controller 500. This order may be stored as a list in the database 608. In the example of FIG. 7, the Living Room zone/control context is first in the list, a Patio zone/control context is second in the list, etc. A current position in the list is reflected in an indicator 704 in the Now Playing section 702 of FIG. 7.

The analyzer 604 uses the information from the current context tracker 606, the direction of the swipe, and the list of the database 608 to determine in which control context the detected swipe placed the controller 500. For example, when the current control context is the Living Room context shown in FIG. 7 that is first in the list, the swipe detector 602 detects a leftwards swipe in the Now Playing section 702, and the Patio context is second in the list, the analyzer 604 determines that the controller 500 is to change from the Living Room context to the Patio context. Such a change alters the controller 500 to control the physical devices associated with the Patio zone (e.g., the zone player 124 of FIG. 1). As a result, buttons of a Button Bar section 706 will control the physical devices associated with the Patio zone.

Figure 8:
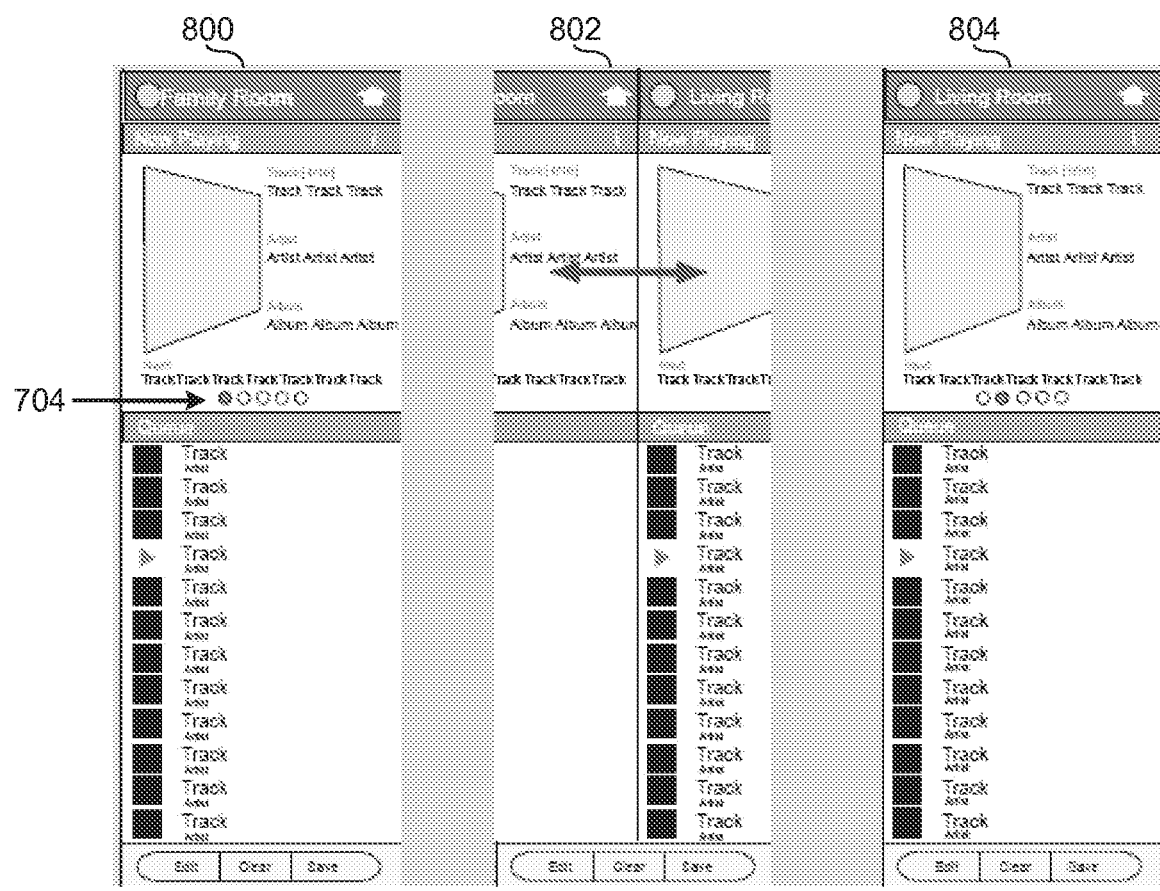
FIG. 8 is a series of screenshots illustrating a transition of the example user interface of FIG. 7.

When the analyzer determines that such a change in control contexts occurred, a context changer 610 changes the control context of the controller 500. For example, the context changer 610 alters which context identifier is stored in the current context tracker 606. Additionally, the context changer 610 makes any necessary changes to setting(s) the microcontroller 506 that dictate which physical devices the controller 500 is configured to communicate with. Additionally, the context changer 610 cooperates with the user interface communicator 600 to change the content of the Now Playing section 702 to reflect the newly entered control context. FIG. 8 is a series of screenshots showing an animated transition from one control context to another in the Now Playing section 702. In particular, a first screenshot 800 shows the Now Playing section 702 when the controller 500 is in a first control context corresponding to a Family Room zone. The swipe detector 602 detects a leftwards swipe in the Now Playing section 702 and, as shown in a second screenshot 802, the Now Playing section 702 transitions from a first display corresponding to the first control context to a second display corresponding to the next control context (as determined by the analyzer 604). A third screenshot 804 shows the Now Playing section 702 including information related to the next control context, which in the example of FIG. 8 corresponds to a Living Room zone. Thus, when the third screenshot 804 is displayed in the Now Playing section 702, the controller 500 is in a second control context and, thus, controls the physical devices of the Living Room zone. As shown in the third screenshot 804, the indicator 704 of the Now Playing section 702 changes to indicate the newly entered position in the list of the database 608. The indicator 704 indicates how many control context(s) are available and whether the additional control contexts can be reached if traversing right or left. In some examples, an end of the list may be linked to a beginning of the list, thereby enabling a wrap around scroll function.

Further, the screenshots 800-804 of FIG. 8 demonstrate that a Queue section 708 adjacent to the Now Playing section 702 also transitions during the change of control contexts. In the illustrated example, the Queue section 708 reflects a list of media items to be presented by the devices (e.g., zone players and/or playback devices) in the zone shown in the Now Playing section 702. The example Queue section 708 is described in greater detail below. Additionally, the screenshots 800-804 of FIG. 8 demonstrate that a Tab Bar section 710 adjacent the Queue section 708 does not transition during the change of control contexts. In the illustrated example, the Tab Bar section 710 provides access to secondary functionality such as settings, a sleep timer, alarms, and/or any other suitable functionality Like the Tab Bar section 710, the Button Bar section 706 does not transition during the change of control contexts. The Tab Bar section 710 and the Button Bar section 706 do not transition because, for example, the functionality of the buttons thereon are respectively universal to the different control contexts.

Figure 9:
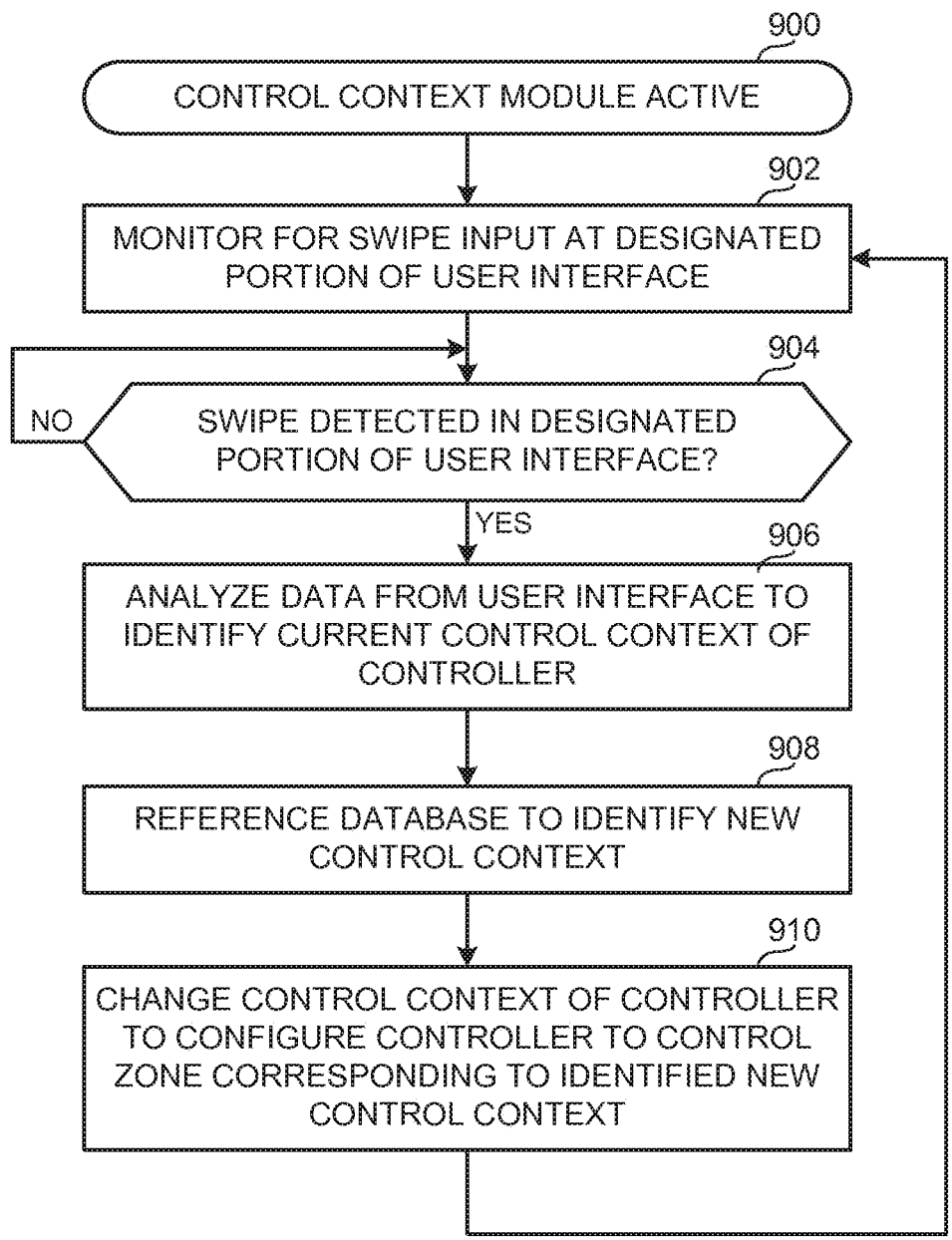
FIG. 9 is a flow diagram representative of example machine readable instructions that can be executed to implement the example control context module of FIGS. 5 and/or 6.

FIG. 9 is a flow diagram representative of example machine readable instructions that may be executed to implement the example control context module 516 of FIGS. 5 and/or 6. The control context module 516 is active in response to, for example, a powering on of the controller 500 (block 900). While active, the control context module 516 monitors a designated area of a user interface for a swiping motion across a touch screen (block 902). In particular, the user interface communicator 600 provides information regarding interactions with a user interface of the controller 500 to the swipe detector 602. The swipe detector 602 determines whether any of the interactions with the controller user interface is a swipe in the designated area (e.g., the Now Playing section 702 of FIG. 7) (block 904).

When the swipe detector 602 determines that a swipe has occurred, the analyzer 604 determines a current control context of the controller 500 (block 906). To do so, the analyzer 604 references the current context tracker 606, which stores an identifier associated with the currently controlled zone. Further, the analyzer 604 references the control context definitions database 608 to identify a new control context into which the detected swipe moved the controller 500 (block 908). In particular, the analyzer 604 uses a direction of the detected swipe (e.g., as provided by the swipe detector 602) and a list of the database 608 to determine which control context the swipe was towards.

The control context changer 610 changes the control context is which the controller 500 is operating (block 910). In the illustrated example, the control context changer 610 makes this change by altering setting(s) in the microcontroller 506. In some examples, the control context changer 610 makes this change via additional or alternative changes and/or interactions with the controller 500. Control then returns to block 902 to detect additional swipes in the designated area.

VI. Queue Position Placement

Figure 10:
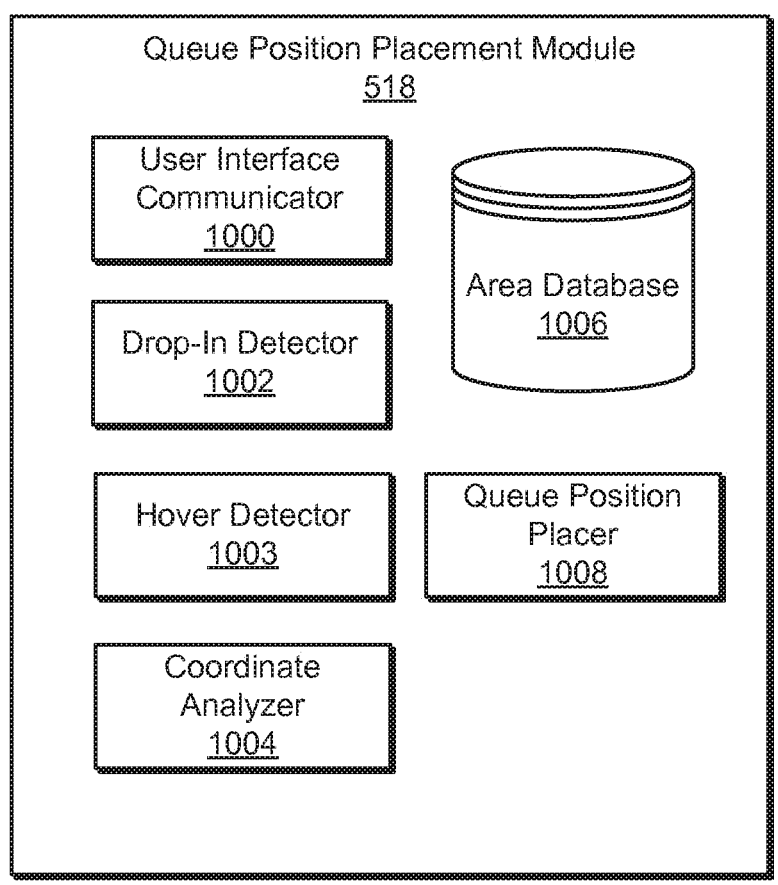
FIG. 10 shows an internal functional block diagram of an example implementation of the queue position placement (QPP) module of FIG. 5.

An example apparatus that may be used to implement the example queue position placement (QPP) module 518 of FIG. 5 is illustrated in FIG. 10. Generally, the example QPP module 518 of FIG. 10 enables a user of a touch screen interface to utilize a plurality of previously unavailable techniques to place a media item in a queue (e.g., the example Queue section 708 of FIG. 7 associated with the controller 500 of FIG. 5). In previous systems, the user was required to scroll through potentially long queues to place a media item in a desired position. The example QPP module 518 disclosed herein enables the user to avoid such tedious scrolling by providing one or more drop areas into which a media item may be dragged and dropped. Additionally or alternatively, the example QPP module 518 disclosed herein enables the user to avoid tedious scrolling by providing one or more hover areas on which a media item may be dragged and held. Each drop area and hover area defined by the QPP module 518 has a rule that controls a placement of the media item into the Queue section 708 and/or an action to be taken by the Queue section 708 (e.g., accelerating scrolling). A rule may cause, for example, any media items dropped into a drop area to be automatically placed at a predetermined position within the Queue section 708. Thus, the QPP module 518 enables the user to place the media item at a predetermined position with a single interaction with the screen 502 of the controller 500 without having to scroll through the Queue section 708. Additionally or alternatively, a rule may cause, for example, a queue of the Queue section 708 to be rapidly scrolled, thereby providing quicker access to portions of the queue.

The example QPP module 518 of FIG. 10 includes a user interface communicator 1000. The user interface communicator 1000 is similar to the user interface 600 of FIG. 6. In particular, the user interface communicator 1000 of FIG. 10 interacts with or may be integrated with a user interface of the controller 500, such as a user interface providing input to the input interface 514 of FIG. 5. The user interface communicator 1000 enables the QPP module 518 to receive information regarding such inputs. For example, the user interface communicator 1000 receives inputs related to media items being dragging across, held upon, and/or dropped in designated sections of the user interface implemented by the controller 500 such as, for example, the Now Playing section 702 and/or the Queue section 708.

The user interface communicator 1000 receives information related to inputs received in connection with the designated sections (e.g., the Now Playing section 702 and/or the Queue section 708) and provides the received information to a drop-in detector 1002 and a hover detector 1003. The drop-in detector 1002 interprets information received via the user interface communicator 1000 to determine whether a media item has been dropped into one of the designated sections (e.g., a drop area). The hover detector 1003 interprets information received via the user interface communicator 1000 to determine whether a media item is being hovered on one of the designated sections (e.g., a hover area). A media item is dropped into a target section by selecting an icon associated with the media item (e.g., by double clicking and holding the icon on a touch screen) from an originating section (e.g., a library), dragging the icon into the target section, and releasing the icon while the icon hovers over the target section. A media item is hovered on a target section by selecting an icon associated with the media item from an originating section, dragging the icon onto the target section, and holding the icon on the target section for certain period of time (e.g., a predetermined amount of time defined to be associated with a hovering action). A user drops a media item into the target section when the user desires to, for example, add the media item to a task or functionality associated with the target section. For example, when the user desires to add a song to a playlist, the user may drag an icon associated with the song from a Media Source section 712 (FIG. 7) to the Now Playing section 702 or the Queue section 708. Depending on when the user desires to listen to the song, the user aims to place the icon in an appropriate position of the target section. As described below in connection with FIG. 16, a user hovers a media item on a target section when the user desires to scroll through the queue.

To improve the ability of the user to place a media item in a desired position within, for example, the Queue section 708, the example QPP module 518 provides a plurality of drop areas, hover areas, and corresponding rules that automatically place the media item into the Queue section 708 and/or cause the Queue section to automatically take an action. In particular, the QPP module 518 includes a coordinate analyzer 1004 to determine a location on the screen 502 at which the media item was dropped and/or hovered (as detected by the drop-in detector 1002 or the hover detector 1003). Different coordinates on the screen 502 correspond to different drop areas and/or hover areas defined by the QPP module 518. In some examples, one or more drop areas may overlap with one or more hover areas. The drop areas and the hover areas and the corresponding coordinates are stored in an area database 1006. When the drop-in detector 1002 or the hover detector 1003 determines that a drop-in or hover has occurred, the coordinate analyzer 1004 identifies coordinates (e.g., in an X-Y coordinate grid of the screen) at which the media item was dropped or hovered. The coordinate analyzer 1004 references an area database 1006 with the coordinates to identify a drop area or hover area of the user interface corresponding to the location at which the drop-in or hovering occurred. The area database 1006 includes an entry corresponding to the coordinates that defines in which of a plurality of drop areas or hover areas the drop-in or hovering, respectively, occurred. Further, that entry of the area database 1006 includes an instruction or definition that dictates how (e.g., where) the media item is to be placed in the Queue section 708 and/or an action to be taken by the Queue section 708. In other words, the QPP module 518 places a media item that was dropped into a drop area into the Queue section 708 in accordance with a predefined or predetermined positioning rule for that drop area. Further, the QPP module 518 causes the Queue section 708 to take one or more predefined actions in accordance with a corresponding rule when a media item is hovered in a hover area. For the drop areas, the instruction and/or definition of the area database 1006 that determines how (e.g., where) the media item is placed into the Queue section 708 is provided to the queue position placer 1008. The queue position placer 1008 executes the instruction and/or definition provided by the area database 1006 so that the media item is automatically placed in the predetermined or predefined position of the Queue section 708. Example drop areas and hover areas and example automatic placements and actions for dropped and hovered media items are described below in connection with FIGS. 11-16.

Figure 11:
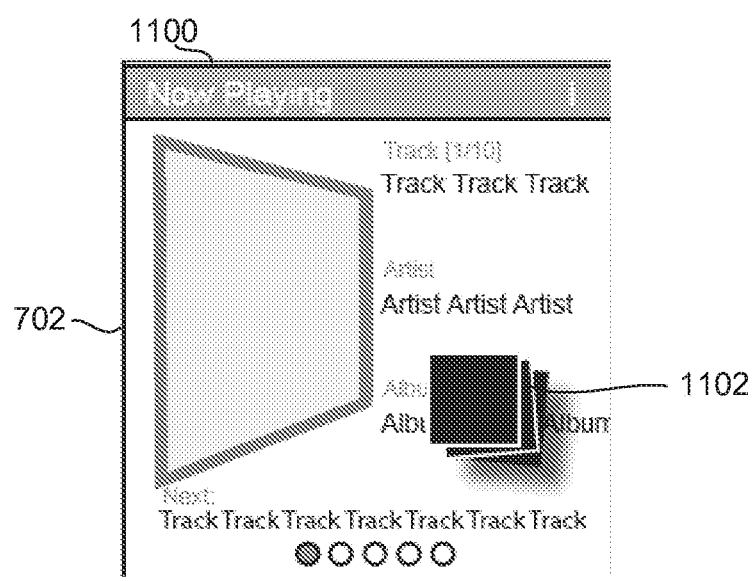
FIG. 11 is a screenshot of a portion of an example user interface associated with the example QPP module of FIGS. 5 and/or 11.

FIG. 11 is a screenshot 1100 of the example Now Playing section 702 of FIG. 7. In the illustrated example of FIG. 11, the Now Playing section 702 defines a drop area into which a media item 1102 can be dropped. As with each example described herein, the media item 1102 can be a single media item (e.g., a song) or a collection of media items (e.g., an album). Also, the media item 1102 can be dragged from any suitable section of the user interface, such as the Media Source section 712 (FIG. 7). In FIG. 11, the media item 1102 is an album that has been dragged from the Media Source section 712, which includes a music library of media items available to the user of the controller 500. The library of the Media Source section 712 can include one or more of a local library of media items, a non-local library of media items, media items from a media service of a cloud, media items listing as search results from a query of the cloud service, and/or any other suitable source of media items available to the controller 500. When the drop-in detector 1002 and the coordinate analyzer 1004 determine that the media item 1102 has been dropped in the Now Playing section 702, a border of an album artwork portion is highlighted and the controller causes a playback device to output the media item. Further, when the drop-in detector 1002 and the coordinate analyzer 1004 determine that the media item 1102 has been dropped in the Now Playing section 702, the queue position placer 1008 places the media item 1102 at the end of a queue in the Queue section 708. Thus, when the user drags and drops the media item 1102 into the drop area defined as the Now Playing section 702, the media item 1102 is immediately played by a playback device (e.g., one associated with the current control context of the Now Playing section 702) and the media item 1102 is placed at the end of the queue to be played by that playback device. As a result, the user avoids having to take two actions (e.g., playing the media item and placing the media item in the queue) and having to scroll down to the bottom of the queue, which may be quite lengthy. Instead, a single drop of the media item 1102 in the drop area defined by the Now Playing section 702 accomplishes the desired results.

Figure 12:
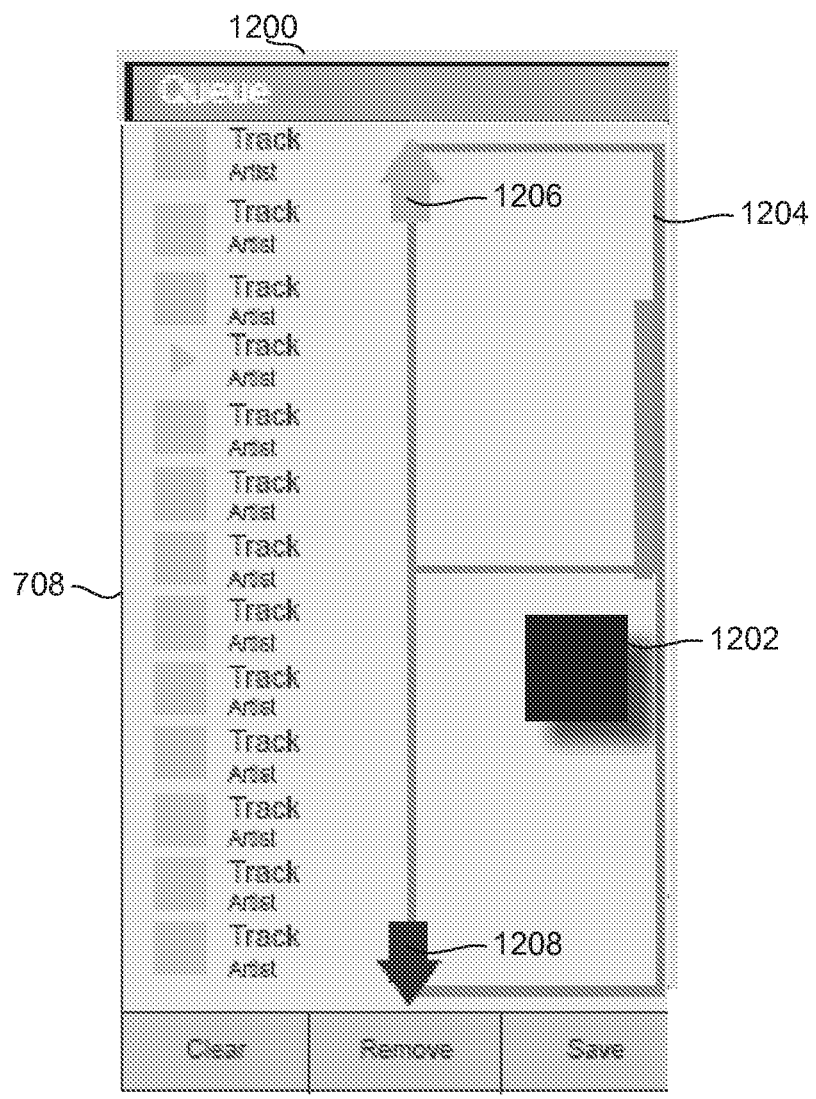
FIG. 12 is a screenshot of a portion of an example user interface associated with the example QPP module of FIGS. 5 and/or 11.

FIG. 12 is a screenshot 1200 of the Queue section 708 of FIG. 7. In the example of FIG. 12, a drop area into which a media item 1202 may be dropped is defined as the right side of the Queue section 708, as delineated by a border 1204 in FIG. 12. In FIG. 12, the media item 1202 is a single media item associated with a song that has been dragged from the Media Source section 712. When the drop-in detector 1002 and the coordinate analyzer 1004 determine that the media item 1202 has been dragged to the right side of the Queue section 708, the border 1204 is highlighted to inform the user of the borders of the drop area. In FIG. 12, the border 1204 defines a top portion of the drop area and a bottom portion of the drop area. The top portion includes an upward arrow 1206 and the bottom portion includes a downward arrow 1208. In some examples, the arrows 1206 and 1208 appear in response to the media item 1202 being dragged into the drop area defined as the right side of the Queue section 708. When the drop-in detector 1002 and the coordinate analyzer 1004 determine that the media item 1202 has been dropped in the top portion of the drop area (e.g., within the top portion of the border 1204 or on the upward arrow 1206), the queue position placer 1008 places the media item 1202 at the top of a queue in the Queue section 708. Further, when the drop-in detector 1002 and the coordinate analyzer 1004 determine that the media item 1202 has been dropped in the bottom portion of the drop area (e.g., within the bottom portion of the border 1204 or on the downward arrow 1208), the queue position placer 1008 places the media item 1202 at the bottom of a queue in the Queue section 708. Thus, when the user drags and drops the media item 1202 into the top portion or the bottom portion of the drop area defined as the right side of the Queue section 708, the user avoids having to scroll up to the top of the queue or down to the bottom of the queue, which may be quite lengthy. Instead, a drop of the media item 1202 anywhere in the top or bottom portion of the drop area defined by the border 1204 accomplishes the desired result. Moreover, the border 1204 and/or the arrows 1206 and 1208 may flash or otherwise be highlighted when, for example, the media item 1202 is dragged and/or dropped on the arrows 1206, 1208 or the border 1204 (e.g., according to a position of a cursor) to provide feedback to the user regarding the interaction with the respective element. In contrast to the example of FIG. 11, the media item is not immediately played when the media item 1202 is dropped in the drop area shown in FIG. 12, for example.

Figure 13:
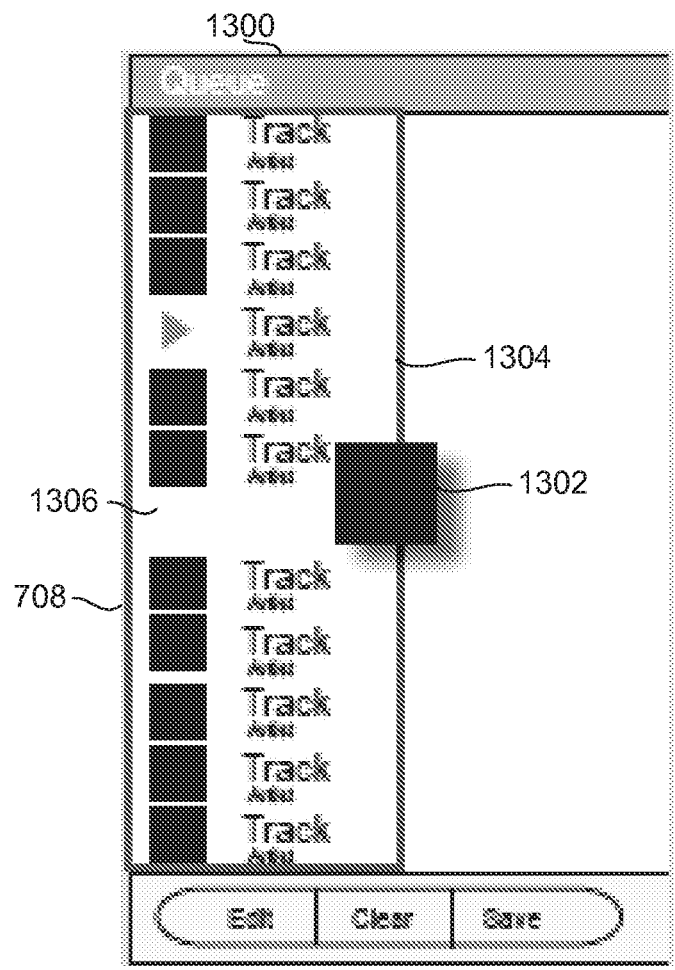
FIG. 13 is a screenshot of a portion of an example user interface associated with the example QPP module of FIGS. 5 and/or 11.

FIG. 13 is a screenshot 1300 of the Queue section 708 of FIG. 7. In the example of FIG. 13, a drop area into which a media item 1302 may be dropped is defined as the left side of the Queue section 708, as delineated by a border 1304 in FIG. 13. In FIG. 13, the media item 1302 is a single media item associated with a song that has been dragged from the Media Source section 712. When the drop-in detector 1002 and the coordinate analyzer 1004 determine that the media item 1302 has been dropped in the left side of the Queue section 708, the border 1304 is highlighted to inform the user of the borders of the drop area. Further, when the drop-in detector 1002 and the coordinate analyzer 1004 determine that the media item 1302 has been dropped in the left side of the Queue section 708, the queue position placer 1008 places the media item 1302 at a position in the queue at which the media item 1302 is released (e.g., dropped). As the user scrolls the media item 1302 up or down the queue in the drop area defined as the left side of the Queue section 708, a slot 1306 opens within the queue where the media item 1302 is over. In some examples, the slot 1306 opens below the queue item having a boundary box that includes a vertical midpoint of the media item icon, thereby pushing the rest of the queue items downwards. When the user releases the media item 1302, the queue position placer 1008 places the media item 1302 in the slot 1306. In the illustrated example, the media item 1302 is not immediately played in response to the media item 1302 being dropped in the drop area of FIG. 13.

Figure 14:
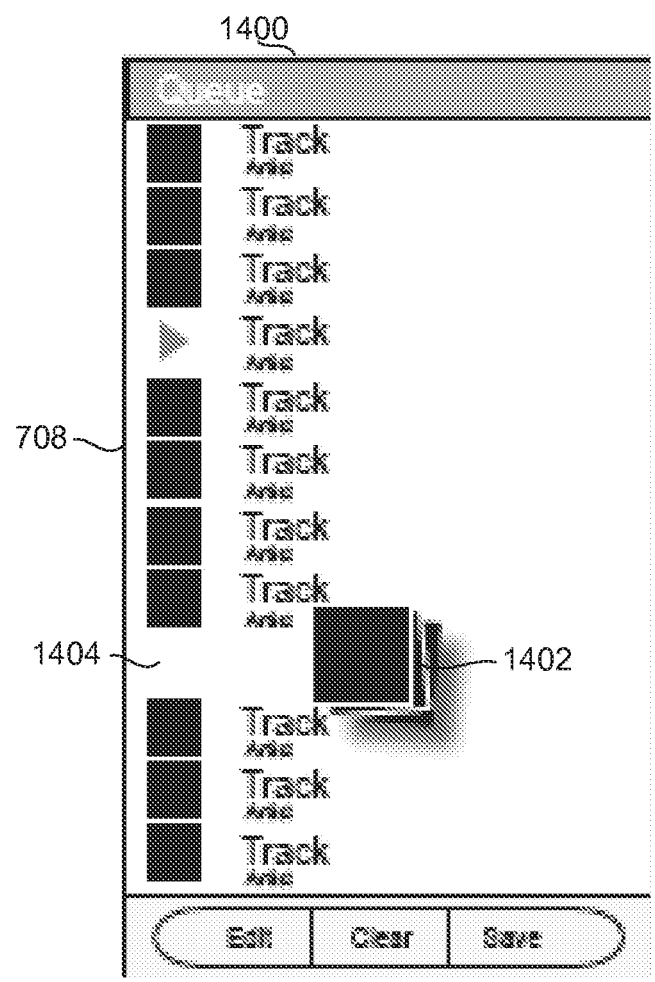
FIG. 14 is a screenshot of a portion of an example user interface associated with the example QPP module of FIGS. 5 and/or 11.
Figure 15:
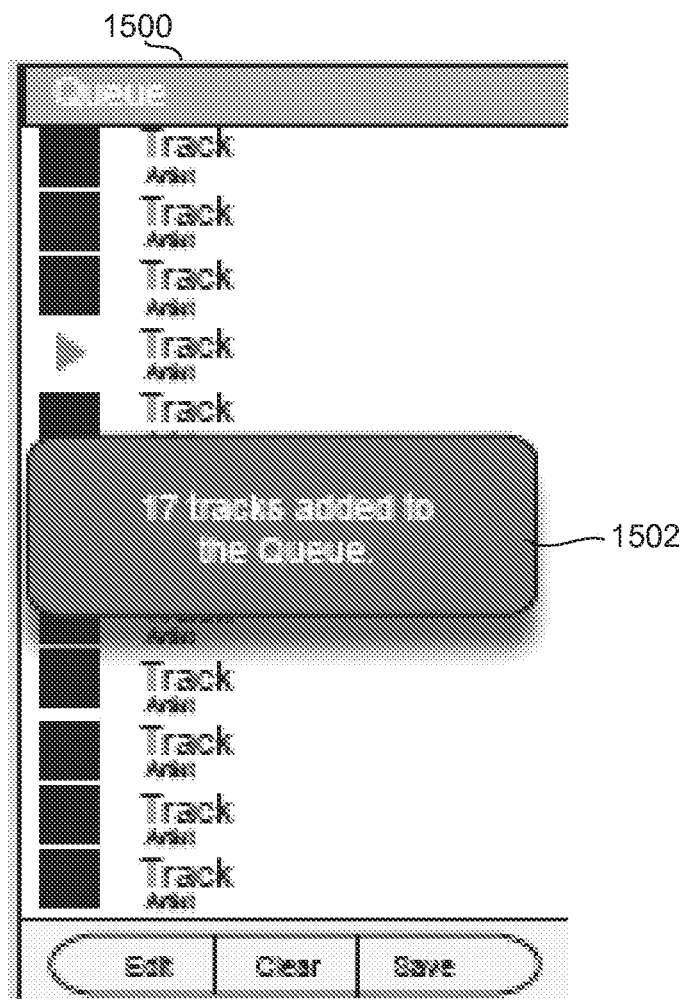
FIG. 15 is a screenshot of a portion of an example user interface associated with the example QPP module of FIGS. 5 and/or 11.

FIG. 14 is screenshot 1400 of the Queue section 708 of FIG. 7. The example of FIG. 14 is similar to the example of FIG. 13 in that a drop area into which a media item 1402 may be dropped is defined as the left side of the Queue section 708. While the media 1302 of FIG. 13 is a single media item, the media item 1402 of FIG. 14 is a collection of media items, such as an album. In such instances, a slot 1404 is created in the queue of the Queue section 708 and the queue position placer 1008 places the collection media item 1402 in the slot 1404. In some examples, the individual items of the collection of media items fill the slot 1404, which expands to accommodate the media items. When the queue position placer 1008 places such a collection, a message may be displayed (e.g., via the user interface communicator 1002) on the screen 502. FIG. 15 is a screenshot 1500 of the Queue section 708 of Figure including an example message 1502 indicating that a collection of media items has been added to the queue and a number of individual items that has been added to the queue.

Figure 16:
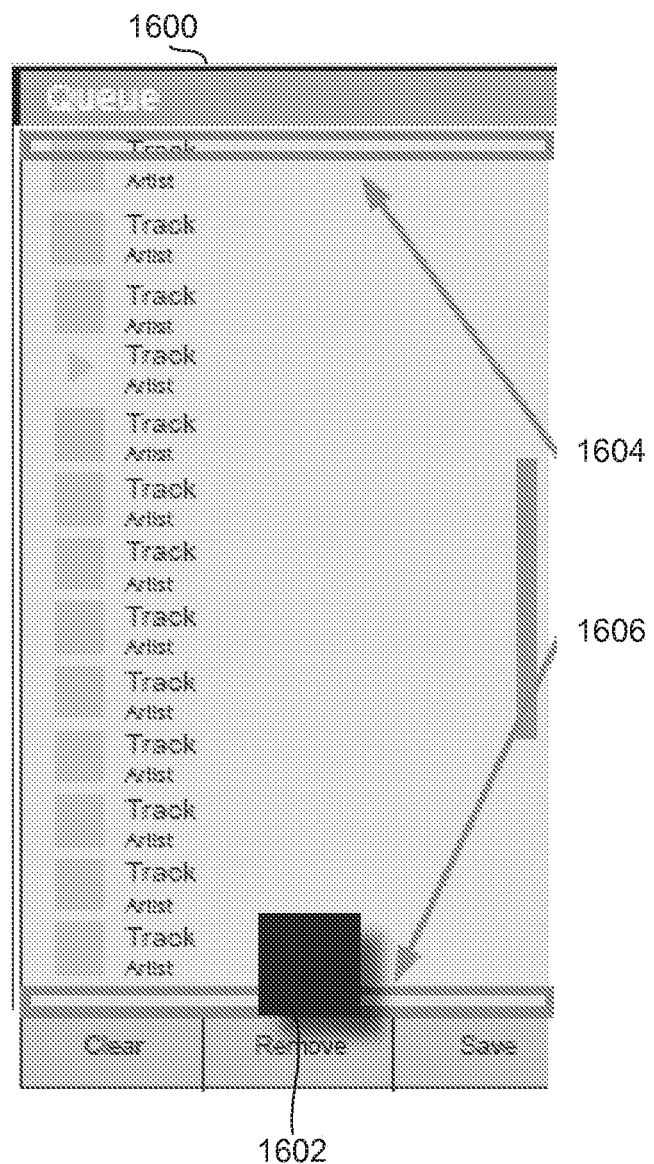
FIG. 16 is a screenshot of a portion of an example user interface associated with the example QPP module of FIGS. 5 and/or 11.

FIG. 16 is a screenshot 1600 of the Queue section 708 of FIG. 7. In the example of FIG. 16, two hover areas on which a media item 1602 may be hovered are defined as a top 1604 of the Queue section 708 and bottom 1606 of the Queue section 708. In FIG. 16, the media item 1602 is a single media item associated with a song that has been dragged from the Media Source section 712. When the hover detector 1003 and the coordinate analyzer 1004 determine that the media item 1602 is being hovered on the top hover area 1604 for a predetermined amount of time (e.g., one second or three seconds), the queue of the Queue section 708 is rapidly scrolled upwards from a current position. If the queue is or has reached the first item in the queue and the hover detector 1003 detects that the user still holds on to the media item 1602, a drop zone (e.g., as shown in FIGS. 13 and 14) appears at the top of the queue and the media item 1602 is added to the queue at a predetermined position (e.g., at a top spot of the queue). When the hover detector 1003 and the coordinate analyzer 1004 determine that the media item 1602 is being hovered on the bottom hover area 1606 for a predetermined amount of time (e.g., one second), the queue of the Queue section 708 is rapidly scrolled downwards from a current position. If the queue is or has reached the last item in the queue and the hover detector 1003 detects that the user still holds on to the media item 1602, a drop zone appears at the bottom of the queue and the media item 1602 is added to the queue at a predetermined position (e.g., at a bottom spot of the queue). In some examples, when the accelerated scroll operation described above is active (e.g., while the queue is scrolling upwards or downwards), other indicators (e.g., the arrows 1206 and 1208 of FIG. 12) may be removed from the display.

Figure 17:
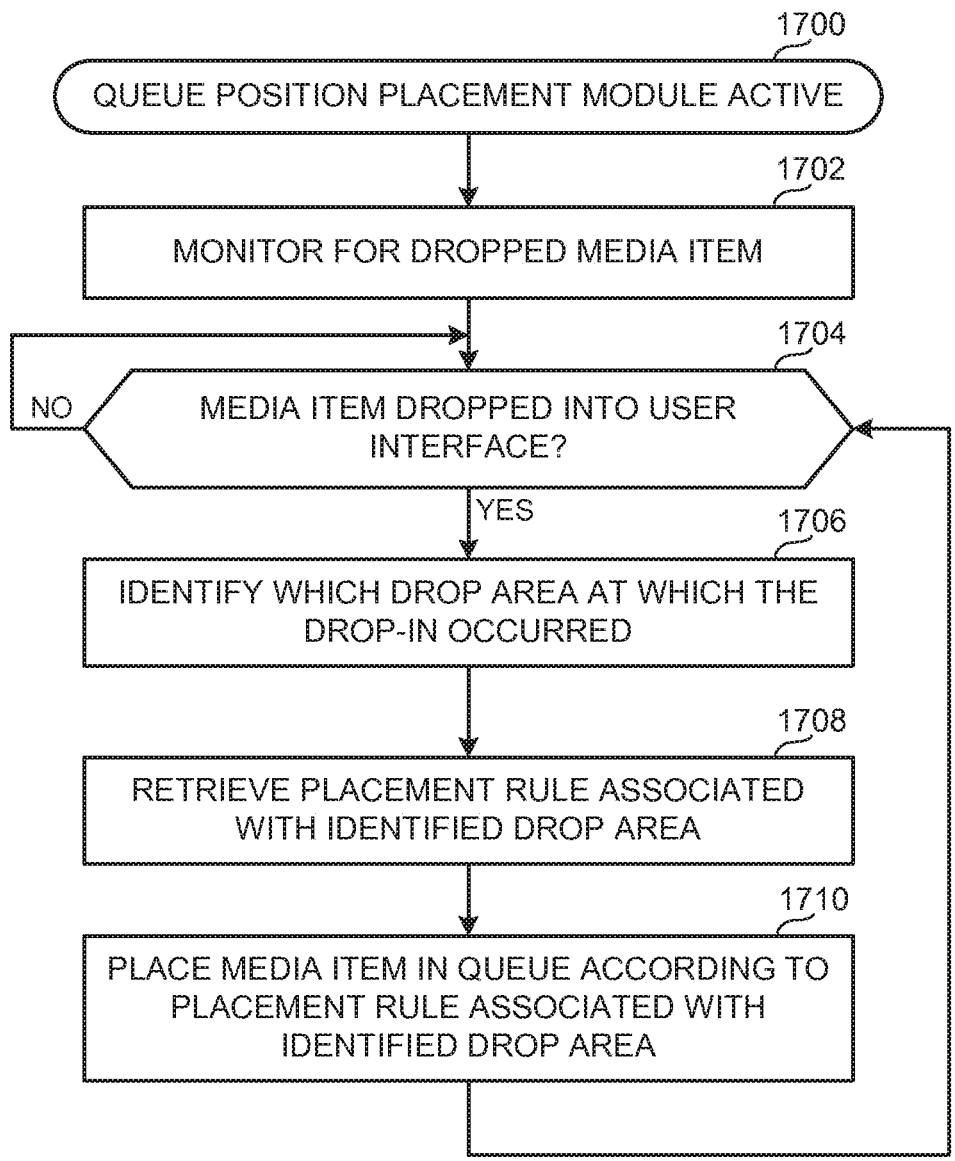
FIG. 17 is a flow diagram representative of example machine readable instructions that can be executed to implement the example QPP module of FIGS. 5 and/or 11.

FIG. 17 is a flow diagram representative of example machine readable instructions that may be executed to implement the example QPP module 518 of FIGS. 5 and/or 10. The QPP module 518 is active in response to, for example, a powering-on of the controller 500 (block 1700). While active, the QPP module 518 monitors a designated area of a user interface (e.g., the Now Playing section 702 of the Queue section 708) for a dropped media item via a touch screen (block 1702). In particular, the user interface communicator 1000 provides information regarding interactions with a user interface of the controller 500 to the drop-in detector 1002. The drop-in detector 1002 determines whether any of the interactions with the controller user interface is a drop of a media item in the designated area (block 1704).

When the drop-in detector 1002 determines that a drop-in has occurred, the coordinate analyzer 1004 determines where the drop-in occurred by using the coordinates corresponding to the drop-in to reference the area database 1006 (block 1706). An entry in the area database 1006 associated with the coordinates of the drop-in indicates which (if any) of one or more drop areas the media item was dropped into. The database 1006 also includes a placement rule associated with the identified drop area that controls how the dropped media item is to be placed in, for example, a queue of media items (block 1708). The queue position placer 1008 uses the placement rule to place the dropped media item into the queue in a predetermined position (block 1710). Control then returns to block 1704.

Various inventions have been described in sufficient detail with a certain degree of particularity. It is understood to those skilled in the art that the present disclosure of embodiments has been made by way of examples only and that numerous changes in the arrangement and combination of parts may be resorted without departing from the spirit and scope of the present disclosure as claimed. While the embodiments discussed herein may appear to include some limitations as to the presentation of the information units, in terms of the format and arrangement, the embodiments have applicability well beyond such embodiment, which can be appreciated by those skilled in the art. Accordingly, the scope of the present disclosure is defined by the appended claims rather than the forgoing description of embodiments.

We claim:

1. A method to be performed by a mobile device, the method comprising:
displaying, via a touch-screen display of the mobile device, a control application of a media playback system comprising multiple zones, wherein a first zone of the multiple zones includes one or more first playback devices and a second zone of the multiple zones includes one or more second playback devices;

receiving, via the control application, input data representing a command to display a first control interface from among multiple control interfaces of the control application, wherein the multiple control interfaces correspond to respective zones, and wherein the multiple control interfaces are configured to be displayed substantially full-screen within a displayable area of the touch-screen display;

in response to receiving the input data to display the first control interface, displaying, via the touch-screen display of the mobile device, the first control interface, wherein the first control interface comprises: (i) a graphical representation of a name of the first zone; (ii) a first region comprising (a) transport controls selectable to control playback by the first zone and (b) a volume control to control volume of the one or more first playback devices; (iii) a second region comprising graphical representations of metadata associated with a first audio track in a playback queue of the first zone; and (iv) a graphical representation of a first position in an ordered list of the multiple zones;

while displaying the first control interface, detecting, in the second region of the first control interface, touch-input data representing a first swipe input;

determining that the first swipe input is in a first direction corresponding to a subsequent position in the ordered list; and in response to receiving the touch-input data representing the first swipe input and determining that the first swipe input is in the first direction corresponding to the subsequent position in the ordered list, changing interfaces of the control application from displaying the first control interface to displaying a second control interface of the control application, wherein the second control interface comprises: (i) a graphical representation of a name of the second zone; (ii) a first region comprising (a) transport controls selectable to control playback by the second zone and (b) a volume control to control volume of the one or more second playback devices; (iii) a second region comprising graphical representations of metadata associated with a second audio track in a playback queue of the second zone; and (iv) a graphical representation of a second position in the ordered list of the multiple zones.

2. The method of claim 1, further comprising:

while displaying the second control interface, detecting, in the second region of the second control interface, touch-input data representing a second swipe input;

determining that the second swipe input is in the first direction corresponding to a subsequent position in the ordered list; and in response to receiving the touch-input data representing the second swipe input and determining that the second swipe input is in the first direction corresponding to the subsequent position in the ordered list, changing interfaces of the control application from displaying the second control interface to displaying a third control interface of the control application, wherein the second control interface comprises: (i) a graphical representation of a name of a zone group comprising a third zone and a fourth zone configured to play back in synchrony, wherein the third zone includes one or more third playback devices and the fourth zone includes one or more fourth playback devices; (ii) a first region comprising (a) transport controls selectable to control playback by the zone group and (b) a volume control to control volume of the one or more third playback devices and the one or more fourth playback devices; (iii) a second region comprising graphical representations of metadata associated with a third audio track in a playback queue of the zone group; and (iv) a graphical representation of a third position in the ordered list of the multiple zones.

3. The method of claim 1, further comprising:

while displaying the second control interface, detecting, in the second region of the second control interface, touch-input data representing a second swipe input;

determining that the second swipe input is in a second direction corresponding to a previous position in the ordered list; and in response to receiving the touch-input data representing the second swipe input and determining that the second swipe input is in the second direction corresponding to the previous position in the ordered list, changing interfaces of the control application from displaying the second control interface to displaying the first control interface of the control application.

4. The method of claim 1, wherein the first control interface further comprises a third region comprising a graphical representation of the playback queue of the first zone, and wherein the second control interface further comprises a third region comprising a graphical representation of the playback queue of the second zone.

5. The method of claim 4, wherein the third region of the first control interface and the third region of the second control interface are scrollable via touch input in a vertical direction within the third regions.

6. The method of claim 1, wherein changing interfaces of the control application from displaying the first control interface to displaying the second control interface of the control application comprises displaying an animation showing a transition from displaying the first control interface to displaying the second control interface.

7. The method of claim 1, wherein the first control interface and the second control interface are displayed in a portrait orientation on the touch-screen display of the mobile device, and wherein the first direction is horizontal relative to the portrait orientation.

8. The method of claim 1, further comprising:

before changing interfaces of the control application from displaying the first control interface to displaying the second control interface of the control application, receiving input data representing a command to play back one or more particular audio tracks in the first zone; and based on receiving the input data representing the command, sending, via a network interface of the mobile device to the one or more first playback devices of the first zone, instructions to play back the one or more particular audio tracks, wherein the one or more first playback devices continue to play back the one or more particular audio tracks after changing interfaces of the control application from displaying the first control interface to displaying the second control interface of the control application.

9. A tangible, non-transitory, computer-readable medium storing instructions that, when executed by one or more processors, cause a mobile device to perform functions comprising:

displaying, via a touch-screen display of the mobile device, a control application of a media playback system comprising multiple zones, wherein a first zone of the multiple zones includes one or more first playback devices and a second zone of the multiple zones includes one or more second playback devices;

receiving, via the control application, input data representing a command to display a first control interface from among multiple control interfaces of the control application, wherein the multiple control interfaces correspond to respective zones, and wherein the multiple control interfaces are configured to be displayed substantially full-screen within a displayable area of the touch-screen display;

in response to receiving the input data to display the first control interface, displaying, via the touch-screen display of the mobile device, the first control interface, wherein the first control interface comprises: (i) a graphical representation of a name of the first zone; (ii) a first region comprising (a) transport controls selectable to control playback by the first zone and (b) a volume control to control volume of the one or more first playback devices; (iii) a second region comprising graphical representations of metadata associated with a first audio track in a playback queue of the first zone; and (iv) a graphical representation of a first position in an ordered list of the multiple zones;

while displaying the first control interface, detecting, in the second region of the first control interface, touch-input data representing a first swipe input;

determining that the first swipe input is in a first direction corresponding to a subsequent position in the ordered list; and in response to receiving the touch-input data representing the first swipe input and determining that the first swipe input is in the first direction corresponding to the subsequent position in the ordered list, changing interfaces of the control application from displaying the first control interface to displaying a second control interface of the control application, wherein the second control interface comprises: (i) a graphical representation of a name of the second zone; (ii) a first region comprising (a) transport controls selectable to control playback by the second zone and (b) a volume control to control volume of the one or more second playback devices; (iii) a second region comprising graphical representations of metadata associated with a second audio track in a playback queue of the second zone; and (iv) a graphical representation of a second position in the ordered list of the multiple zones.

10. The tangible, non-transitory, computer-readable medium of claim 9, wherein the functions further comprise:

while displaying the second control interface, detecting, in the second region of the second control interface, touch-input data representing a second swipe input;

determining that the second swipe input is in the first direction corresponding to a subsequent position in the ordered list; and in response to receiving the touch-input data representing the second swipe input and determining that the second swipe input is in the first direction corresponding to the subsequent position in the ordered list, changing interfaces of the control application from displaying the second control interface to displaying a third control interface of the control application, wherein the second control interface comprises: (i) a graphical representation of a name of a zone group comprising a third zone and a fourth zone configured to play back in synchrony, wherein the third zone includes one or more third playback devices and the fourth zone includes one or more fourth playback devices; (ii) a first region comprising (a) transport controls selectable to control playback by the zone group and (b) a volume control to control volume of the one or more third playback devices and the one or more fourth playback devices; (iii) a second region comprising graphical representations of metadata associated with a third audio track in a playback queue of the zone group; and (iv) a graphical representation of a third position in the ordered list of the multiple zones.

11. The tangible, non-transitory, computer-readable medium of claim 9, wherein the functions further comprise:

while displaying the second control interface, detecting, in the second region of the second control interface, touch-input data representing a second swipe input;

determining that the second swipe input is in a second direction corresponding to a previous position in the ordered list; and in response to receiving the touch-input data representing the second swipe input and determining that the second swipe input is in the second direction corresponding to the previous position in the ordered list, changing interfaces of the control application from displaying the second control interface to displaying the first control interface of the control application.

12. The tangible, non-transitory, computer-readable medium of claim 9, wherein the first control interface further comprises a third region comprising a graphical representation of the playback queue of the first zone, and wherein the second control interface further comprises a third region comprising a graphical representation of the playback queue of the second zone.

13. The tangible, non-transitory, computer-readable medium of claim 12, wherein the third region of the first control interface and the third region of the second control interface are scrollable via touch input in a vertical direction within the third regions.

14. The tangible, non-transitory, computer-readable medium of claim 9, wherein changing interfaces of the control application from displaying the first control interface to displaying the second control interface of the control application comprises displaying an animation showing a transition from displaying the first control interface to displaying the second control interface.

15. The tangible, non-transitory, computer-readable medium of claim 9, wherein the first control interface and the second control interface are displayed in a portrait orientation on the touch-screen display of the mobile device, and wherein the first direction is horizontal relative to the portrait orientation.

16. The tangible, non-transitory, computer-readable medium of claim 9, wherein the functions further comprise:

before changing interfaces of the control application from displaying the first control interface to displaying the second control interface of the control application, receiving input data representing a command to play back one or more particular audio tracks in the first zone; and based on receiving the input data representing the command, sending, via a network interface of the mobile device to the one or more first playback devices of the first zone, instructions to play back the one or more particular audio tracks, wherein the one or more first playback devices continue to play back the one or more particular audio tracks after changing interfaces of the control application from displaying the first control interface to displaying the second control interface of the control application.

17. A controller comprising:

a touch-screen display;

one or more processors;

data storage storing instructions that when executed by the one or more processors cause the controller to perform functions comprising:

displaying, via the touch-screen display, a control application of a media playback system comprising multiple zones, wherein a first zone of the multiple zones includes one or more first playback devices and a second zone of the multiple zones includes one or more second playback devices;

receiving, via the control application, input data representing a command to display a first control interface from among multiple control interfaces of the control application, wherein the multiple control interfaces correspond to respective zones, and wherein the multiple control interfaces are configured to be displayed substantially full-screen within a displayable area of the touch-screen display;

in response to receiving the input data to display the first control interface, displaying, via the touch-screen display, the first control interface, wherein the first control interface comprises: (i) a graphical representation of a name of the first zone; (ii) a first region comprising (a) transport controls selectable to control playback by the first zone and (b) a volume control to control volume of the one or more first playback devices; (iii) a second region comprising graphical representations of metadata associated with a first audio track in a playback queue of the first zone; and (iv) a graphical representation of a first position in an ordered list of the multiple zones;

while displaying the first control interface, detecting, in the second region of the first control interface, touch-input data representing a first swipe input;

determining that the first swipe input is in a first direction corresponding to a subsequent position in the ordered list; and in response to receiving the touch-input data representing the first swipe input and determining that the first swipe input is in the first direction corresponding to the subsequent position in the ordered list, changing interfaces of the control application from displaying the first control interface to displaying a second control interface of the control application, wherein the second control interface comprises: (i) a graphical representation of a name of the second zone; (ii) a first region comprising (a) transport controls selectable to control playback by the second zone and (b) a volume control to control volume of the one or more second playback devices; (iii) a second region comprising graphical representations of metadata associated with a second audio track in a playback queue of the second zone; and (iv) a graphical representation of a second position in the ordered list of the multiple zones.

18. The controller of claim 17, wherein the functions further comprise:

while displaying the second control interface, detecting, in the second region of the second control interface, touch-input data representing a second swipe input;

determining that the second swipe input is in the first direction corresponding to a subsequent position in the ordered list; and in response to receiving the touch-input data representing the second swipe input and determining that the second swipe input is in the first direction corresponding to the subsequent position in the ordered list, changing interfaces of the control application from displaying the second control interface to displaying a third control interface of the control application, wherein the second control interface comprises: (i) a graphical representation of a name of a zone group comprising a third zone and a fourth zone configured to play back in synchrony, wherein the third zone includes one or more third playback devices and the fourth zone includes one or more fourth playback devices; (ii) a first region comprising (a) transport controls selectable to control playback by the zone group and (b) a volume control to control volume of the one or more third playback devices and the one or more fourth playback devices; (iii) a second region comprising graphical representations of metadata associated with a third audio track in a playback queue of the zone group; and (iv) a graphical representation of a third position in the ordered list of the multiple zones.

19. The controller of claim 17, wherein the functions further comprise:

while displaying the second control interface, detecting, in the second region of the second control interface, touch-input data representing a second swipe input;

determining that the second swipe input is in a second direction corresponding to a previous position in the ordered list; and in response to receiving the touch-input data representing the second swipe input and determining that the second swipe input is in the second direction corresponding to the previous position in the ordered list, changing interfaces of the control application from displaying the second control interface to displaying the first control interface of the control application.

20. The controller of claim 17, wherein the first control interface further comprises a third region comprising a graphical representation of the playback queue of the first zone, and wherein the second control interface further comprises a third region comprising a graphical representation of the playback queue of the second zone.

* * * * *